US005613050A

United States Patent [19]
Hochmuth et al.

[11] Patent Number: 5,613,050
[45] Date of Patent: Mar. 18, 1997

[54] METHOD AND APPARATUS FOR REDUCING ILLUMINATION CALCULATIONS THROUGH EFFICIENT VISIBILITY DETERMINATION

[75] Inventors: Roland M. Hochmuth, Woodstock; William L. Luken, Yorktown Heights, both of N.Y.

[73] Assignee: International Business Machines Corporation, Armonk, N.Y.

[21] Appl. No.: 462,048

[22] Filed: Jun. 5, 1995

Related U.S. Application Data

[63] Continuation of Ser. No. 6,002, Jan. 15, 1993, abandoned.

[51] Int. Cl.$^6$ .................................................. G06T 15/40
[52] U.S. Cl. .................................................. 395/122
[58] Field of Search .................................. 395/121, 122, 395/128

[56] References Cited

U.S. PATENT DOCUMENTS

| | | | |
|---|---|---|---|
| 4,594,673 | 6/1986 | Holly | 364/522 |
| 4,730,621 | 5/1988 | Smith | 364/522 |
| 4,847,789 | 7/1989 | Kelly et al. | 364/522 |
| 4,855,938 | 8/1989 | Gonzalez-Lopez et al. | 364/522 |
| 4,866,637 | 10/1989 | Gonzalez-Lopez et al. | 364/518 |
| 4,924,414 | 5/1990 | Ueda | 364/522 |
| 4,928,250 | 5/1990 | Greenberg et al. | 364/518 |
| 5,031,117 | 7/1991 | Minor et al. | 364/521 |
| 5,043,921 | 8/1991 | Gonzalez-Lopez et al. | 364/522 |
| 5,043,922 | 8/1991 | Matsumoto | 364/522 |
| 5,075,876 | 12/1991 | Seki et al. | 395/121 |
| 5,081,698 | 1/1992 | Kohn | 395/122 |
| 5,086,496 | 2/1992 | Mulmuley | 395/121 |
| 5,249,264 | 9/1993 | Matsumoto | 395/121 X |
| 5,299,298 | 3/1994 | Elmquist et al. | 395/121 |

OTHER PUBLICATIONS

Computer Graphics: Principles and Practice, J.D. Foley et al., 2nd Ed., (1990), pp. 866–873.
Computer Graphics, vol. 15, No. 3, Aug. 1981, "Parallel Processing Image Synthesis and Anti-Aliasing", Weinberg, pp. 55–62.
8222 IEEE Computer Graphics and Applications, vo. 7, No. 7, Jul. 1987, "A Vectorized Scan-Line Z-Buffer Rendering Algorithm", Dyer et al, pp. 34–45.

Primary Examiner—Mark K. Zimmerman
Attorney, Agent, or Firm—Mark S. Walker; W. A. Kinnaman, Jr.

[57] ABSTRACT

A computer graphics system reduces the number of lighting calculations required to render a scene having objects illuminated by light sources by classifying each primitive for objects in an illuminated scene as either hidden or visible using a z-buffer. In a first approach, only one pass is made through the display list of primitives for the scene, and lighting calculations are performed only for primitives classified as visible. In a second approach, two passes are made through the display list. In the first pass, the display list is fully traversed to set-up the z-buffer, and no lighting calculations are performed. When the second pass of the display list is performed, each primitive is classified as hidden or visible, and lighting calculations are performed for each primitive classified as visible as the display list is traversed. Lighting calculations may be performed using either Gouraud or Phong shading.

27 Claims, 10 Drawing Sheets

METHOD AND APPARATUS FOR REDUCING ILLUMINATION CALCULATIONS THROUGH EFFICIENT VISIBILITY DETERMINATION

This application is a continuation of application Ser. No. 08/006,002, filed Jan. 15, 1993, now abandoned.

FIELD OF THE INVENTION

The present invention relates generally to a computer graphics system for processing data for scenes containing three-dimensional objects and, in particular, to a computer graphics adapter that performs illumination (or lighting) calculations for processing graphical data for scenes containing three-dimensional objects illuminated by one or more light sources.

DESCRIPTION OF THE PRIOR ART

Computer graphics systems are frequently used to model a scene having three-dimensional objects and then display them on a two-dimensional display device such as a cathode ray tube. One such system in common use is a polygonally-based, object-order graphics system, in which three-dimensional objects in a scene are each represented by a multitude of polygons (or primitives) that approximate the shapes thereof. Depending upon the orientation selected for viewing the scene in two dimensions, many of the primitives representing objects in the scene will be hidden behind other primitives and thus not displayed. Primitives not completely hidden are termed visible and will be displayed, either in full or in part depending upon whether a portion of a given primitive is hidden, in the rendered image on the display device. As the depth complexity (i.e. the number of levels of primitives hidden behind one another) of a scene to be rendered increases, the percentage of all primitives representing the scene that will ultimately be visible by a viewer on the display device decreases significantly. Thus, in many cases, most of the primitives for a scene will be hidden.

One method for determining which primitives will be visible or hidden involves the use of a z-buffer (also referred to as a depth buffer). The z-buffer is a large array of memory with an entry for each picture element, or pixel, on the display device.

The Z axis in a graphics system reflects the distance from a specific observer's viewpoint. Thus, a larger Z value represents a greater distance from the viewpoint. A comparison of Z values of points on the generated objects determines which object is closest to the viewpoint and therefore should appear on the two-dimensional display. As a part of processing the graphical data for a scene, pixels are generated for each of the primitives in the scene. In z-buffer systems, as each pixel is generated, its Z coordinate (Znew) is compared with the Z coordinate previously stored in the z-buffer (Zold). Before processing the first primitive for a scene, the z-buffer is initialized by storing the value corresponding to a maximum distance (Zmax) in the z-buffer entry for every pixel so that initially Zold corresponds to Zmax. The z-buffer comparison test used differs depending upon a system's design and/or the current z-buffer comparison condition, but in one approach, if Znew is less than Zold (indicating that this pixel is closer to the viewpoint than the previous viewpoint), then the pixel is written to the display device and the z-buffer memory is updated to contain Znew. If Znew is greater than or equal to Zold, then the pixel is not written and the z-buffer remains unchanged. All of the pixels for a primitive that is completely hidden will ultimately be overwritten in the z-buffer during this process so that the primitive is not displayed. A more detailed description of the z-buffer technique and other graphical processing methods is presented in the book Computer Graphics: Principles and Practice by J. D. Foley et al., second edition, Addison-Wesley Publishing Co., 1990, which is incorporated in full by reference.

A determination of which primitives will be visible in a scene is usually made. In addition, there is often a need for simulating lighting conditions in which the objects in the scene are illuminated by one or more light sources. As a part of this simulation, the effects of the light sources upon the surfaces of the objects in the scene are determined by performing lighting calculations. Typically, the position of each primitive is identified by the coordinates of its vertices in a coordinate system, and each vertex will have a reflectance normal vector with the vertex as its origin. The reflectance normals represent the orientation of the object's surface at that point and are used along with information about the position of the light sources to calculate color values, such as rgb values, for each primitive. These lighting calculations require extensive computations that are expensive and time-consuming relative to other calculations necessary to display a scene, especially for scenes having a high depth-complexity.

In a conventional computer graphics system, the lighting calculations are performed for every primitive before the system determines, for example using a z-buffer, which of the primitives will ultimately be visible in the final, displayed scene. Thus, for a typical scene of moderate depth-complexity, a significant number of lighting calculations are performed unnecessarily and discarded because large numbers of color values are determined for primitives that will be hidden and are therefore not necessary to display the scene. Because the lighting calculations are typically the bottleneck in a computer graphics processing pipeline, it would be advantageous to reduce the number of unnecessary lighting calculations.

Thus, there is a need for a computer graphics system that is more computationally efficient and that reduces the number of unnecessary lighting calculations when processing primitives to display an illuminated scene.

SUMMARY OF THE INVENTION

This need is satisfied, the limitations of the prior art overcome, and other benefits realized in accordance with the principles of the present invention by a computer graphics system that reduces the number of lighting calculations required to render a scene having objects illuminated by light sources. According to the present invention, a computer graphics system classifies each primitive for objects in an illuminated scene as either hidden or visible using a z-buffer. In a first approach, only one pass is made through the display list of primitives for the scene such that the classification of hidden or visible for a given primitive is only valid relative to those primitives in the display list that have already been previously traversed and processed in the z-buffer. Lighting calculations are performed only for primitives classified as visible, and these calculations are performed for each visible primitive following processing in the z-buffer.

In a second approach, two passes (or traversals) are made through the display list. In the first pass, the display list is fully traversed to set-up (or fill) the z-buffer with Znew values for each pixel corresponding to the set of primitives that will ultimately be visible in the final scene. In other words, the visibile surface solution will be completely solved on the first pass through the display list, and this solution will be represented by the contents of the z-buffer memory. During the first pass, no lighting calculations are performed for any primitives.

When the second pass of the display list is performed, each primitive is classified as hidden or visible as in the one-pass approach described above. However, because the z-buffer contains Znew values corresponding to the complete visible surface solution, the classification of a primitive as hidden or visible is valid relative to the final scene that will be displayed, and not merely to the primitives previously traversed on this pass. Lighting calculations are performed for each primitive classified as visible as it is traversed on the second pass through the display list. Thus, lighting calculations are only performed for primitives having at least one pixel that will be displayed in the final scene.

According to the computer graphics system of the present invention, the primitive classification of each primitive in the display list as hidden or visible is determined by using a graphics architecture having a rasterizer limited to rasterizing Z coordinates only (referred to herein as a Z-rasterizer).

According to a preferred embodiment of the present invention, the lighting calculations for primitives classified as visible may be performed using either Gouraud shading or Phong shading. Also, the one-pass and two-pass approaches may be used alternately (i.e. toggled on and off) within the same computer graphics system in response to the lighting characteristics for a particular scene, such as the placement and number of light sources.

This invention has the advantage of reducing the time required to render complex scenes having many primitives, high depth complexity, and elaborate lighting conditions such as where there is simulation of multiple light sources, simulation of light source types such as positional lights or spot-lights, consideration of the location of the viewer in the lighting calculations, and/or the use of Phong shading in which lighting calculations are performed for every pixel. The invention may be operated using either a one-pass or two-pass approach. When the invention is operated using the one-pass approach, the time needed to render a scene may be reduced to about half the time required by conventional graphics systems. When the invention is operated using the two-pass approach, the time needed to render a scene may be reduced to about twice the time required to render the scene without lighting calculations.

Another advantage of the invention is that a larger number of primitives and/or complex lighting calculations can be rendered within a given amount of time so that the quality or realism of real-time interactive computer graphics is increased.

The foregoing and other objects, features, and advantages of the invention will be apparent from the following more particular description of a preferred embodiment of the invention, as illustrated in the accompanying drawings.

BEST MODE FOR CARRYING OUT THE INVENTION

Figure 1:
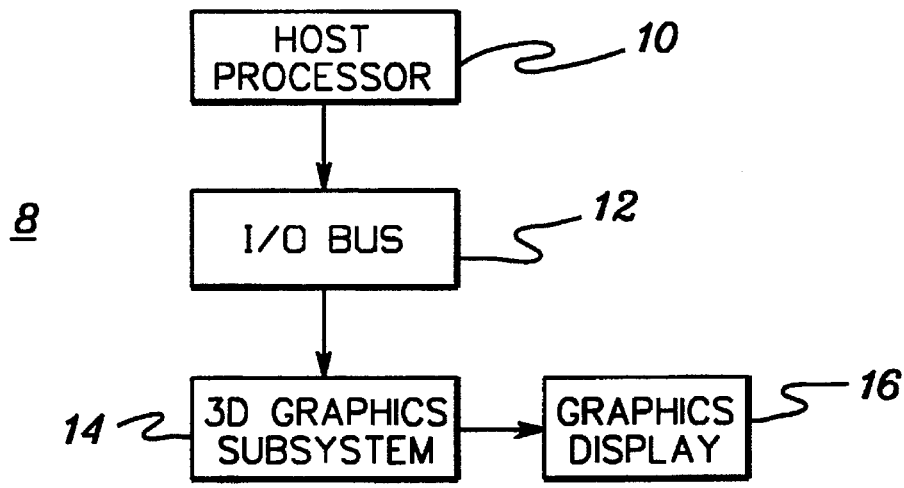
FIG. 1 is a block diagram of a graphics workstation having a three-dimensional graphics subsystem in accordance with the present invention.

The present invention reduces the number of lighting calculations required to render a scene having objects illuminated by light sources. According to the present invention, a computer graphics subsystem classifies each primitive for objects in an illuminated scene as either hidden or visible using a z-buffer. In a first approach (described herein as a one-pass approach), only one pass is made through the display list of primitives for the scene such that the classification of hidden or visible for a given primitive is only valid relative to those primitives in the display list that have already been previously traversed and processed in the z-buffer. Lighting calculations are performed only for primitives classified as visible, and these calculations are performed for each visible primitive following processing in the z-buffer. Thus, some primitives classified as visible during the traversal of the display list will have lighting calculations performed therefor even though it may be determined later in the traversal of the display list that this particular primitive will not be visible in the final, rendered scene. Although the number of unnecessary lighting calculations is significantly reduced using a one-pass approach according to the present invention, for a display list containing primitives in random order, there is still about a fifty percent chance that the lighting calculations for a given primitive will not be necessary because no pixel for that primitive will be displayed.

In a second approach (described herein as a two-pass approach), two passes (or traversals) are made through the display list. In the first pass, the display list is fully traversed to set-up (or fill) the z-buffer with Znew values for each pixel corresponding to the set of primitives that will ultimately be visible in the final scene. In other words, the visibile surface solution will be completely solved on the first pass through the display list, and this solution will be represented by the contents of the z-buffer memory. During the first pass, no lighting calculations are performed for any primitives.

When the second pass of the display list is performed, each primitive is classified as hidden or visible as in the one-pass approach described above. However, because the z-buffer contains Znew values corresponding to the complete visible surface solution, the classification of a primitive as hidden or visible is valid relative to the final scene that will be displayed, and not merely to the primitives previously traversed on this pass. Lighting calculations are performed for each primitive classified as visible as it is traversed on the second pass through the display list. Thus, lighting calculations are only performed for primitives having at least one pixel that will be displayed in the final scene. In other words, there are no unnecessary lighting calculations for primitives classifed as visible that are ultimately determined to be hidden by primitives traversed later in the display list as in the one-pass approach described above.

According to the computer graphics subsystem of the present invention, the primitive classification of each primitive in the display list as hidden or visible is determined by using a graphics architecture having a rasterizer limited to rasterizing Z coordinates only (referred to herein as a Z-rasterizer). According to the present invention, since lighting calculations are not performed until after the primitive classification, it is not necessary to rasterize color values for each primitive until later in the processing pipeline. This differs from a conventional rasterizer in which, for example, the Z coordinate and rgb color values are rasterized following lighting calculations for all primitives.

According to a preferred embodiment of the present invention, the lighting calculations for primitives classified as visible may be performed using either Gouraud shading or Phong shading. Also, the one-pass and two-pass approaches may be used alternately (i.e. toggled on and off) within the same computer graphics subsystem in response to the lighting characteristics for a particular scene, such as the placement and number of light sources. The optimum of the two approaches varies depending upon the lighting characteristics. The present invention is now described in greater detail below.

FIG. 1 illustrates a graphics workstation 8 having a three-dimensional graphics subsystem 14 in accordance with the present invention. A host processor 10 provides graphics data corresponding to a scene to be rendered to graphics subsystem 14 via an input/output bus 12. Graphics subsystem 14 converts the graphics data into a form suitable for display on a graphics display device 16. Workstation 8 may be implemented in many ways. Host processor 10 is a general purpose or RISC central processing unit such as, for example, found on an IBM RISC System/6000 workstation RISC (System/6000 is a trademark of IBM), and input/output bus 12 is, for example, a Micro Channel bus (Micro Channel is a trademark of IBM), NuBus (Nubus is a trademark), or ISA bus. Graphics display 16 is, for example, a cathode ray tube or LCD display. Graphics subsystem 14 is a computer graphics system in accordance with the present invention and is described in greater detail below. Although the graphics subsystem of the present invention is illustrated as part of a graphics workstation, the scope of the present invention is not limited thereto. The graphics subsystem can be implemented in software on a general purpose processor or as part of a co-processor integrated therewith. Also, more specifically, in other embodiments the graphics subsystem of the present invention could be implemented in, for example, video games or flight simulators.

The graphics data provided by host processor 10 consists of data records which identify the type of graphics primitive (e.g. vector, triangle, polygon, triangle strip) that will be rendered along with data corresponding to each vertex of the graphics primitives in the display list. The vertex data typically include values of the geometric coordinates (x, y, z) and components of a reflectance normal vector (Nx, Ny, Nz) for each vertex. In some cases, additional data representing properties such as colors (r, g, b) and/or texture coordinates (s, t) for each vertex are present in the vertex data records.

Figure 2:
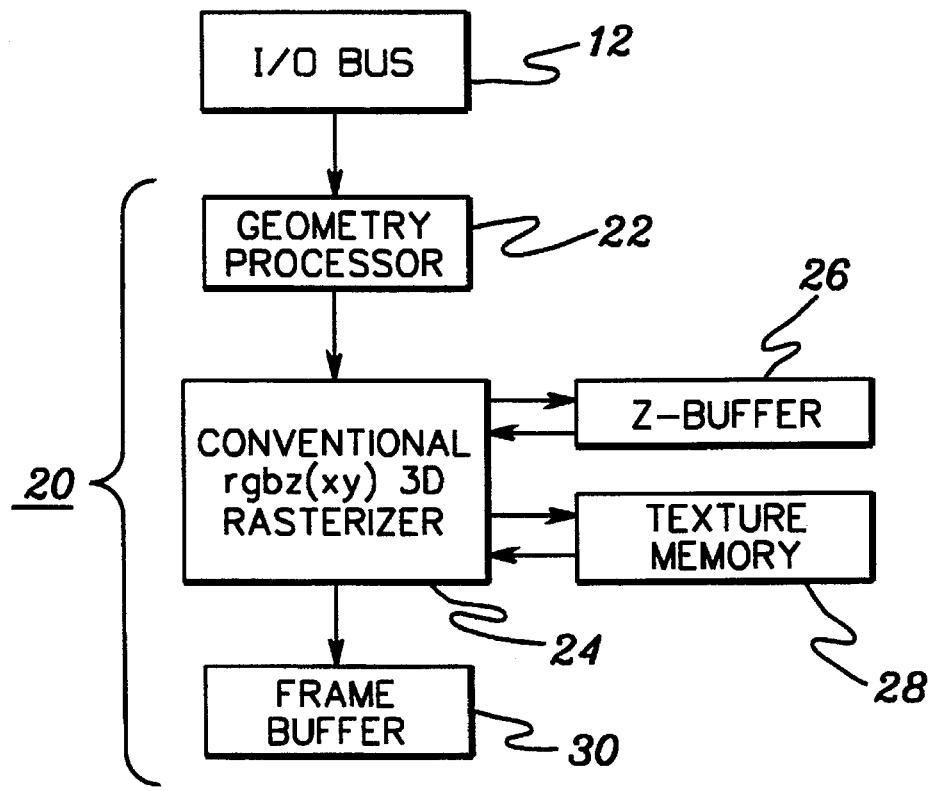
FIG. 2 is a block diagram of a conventional prior art graphics subsystem.

For purposes of comparison to the present invention, a conventional prior art graphics subsystem is illustrated in FIG. 2 and described below. In FIG. 2, graphics data is provided via input/output bus 12 to a conventional three-dimensional graphics subsystem 20, which includes a geometry processor 22, an rgbz-rasterizer 24 having a z-buffer 26 and an optional texture memory 28 for storing texture maps, and a frame buffer 30. Geometry processor 22 typically consists of one or more floating-point processors capable of performing transformation, lighting, clipping, and other required calculations. Geometry processor 22 may be embodied, for example, by a 10 MHz Weitek chip set (an XL-8136 programmable sequencer, an XL-3132 floating point processor unit, and an XL-8137 integer processing unit, working together) available from Weitek of Sunnyvale, Calif. Also, processor 22 may be embodied by the invention disclosed in commonly assigned U.S. patent application Ser. No. 331,021, filed Mar. 28, 1989, and hereby incorporated by reference, which provides special input and output FIFOs for advantageous parallel and/or pipelined interconnection. Geometry processor 22 may also be embodied by an Intel i860 processor.

Rasterizer 24 consists of one or more arithmetic logic units capable of performing integer addition and multiplication in a programmed sequence, as is well-known. For example, rasterizer 24 may be implemented as found on the IBM POWER GTO adapter or on the IBM POWER Gt4x graphics adapter (both POWER GTO and POWER Gt4x are trademarks of IBM). Z-buffer 26 contains sufficient memory to store a depth value for each pixel of graphics display device 16. Typically, this depth value is stored as a 24-bit integer for each pixel. Frame buffer 30 contains sufficient memory to store color data for each pixel of graphics display device 16. This color data typically consists of three 8-bit integers representing red, green, and blue (r, g, b) color values for each pixel.

Geometry processor 22 receives graphics data from host processor 10 and converts this into a form required by rasterizer 24. This requires applying a 4×3 or 4×4 transformation to the coordinates for each vertex, applying a 3×3 transformation to the normal vectors for each vertex, performing lighting calculations to determine color values for each primitive such as those presented in Computer Graphics: Principles and Practice by J. D. Foley et al., second edition, Addison-Wesley Publishing Co., 1990, pp. 866–873 (hereby incorporated by reference), projecting the coordinates into normalized projection coordinates (so as to represent the effects of perspective), and clipping the projected coordinates to a fixed range of x and y values corresponding to the rectangular screen of the graphics display used (x and y extent) and to a fixed range of z values typically mapped from 0 to $(2^{**}n)-1$, where n is the number of bits used for the z-buffer (e.g. n=24 where 24 bits are used). These clipped coordinates are then converted to integer values determined by the resolution of rasterizer 24. In addition, the color values determined by the lighting calculations are converted into integer values of magnitudes corresponding to the operation of rasterizer 24.

Rasterizer 24 accepts the integer values for the x, y, and z coordinates, and the r, g, and b color values for each vertex (when using, for example, Gouraud shading), sorts the vertices for each graphics primitive (e.g. triangle), and calculates the slopes of z, r, g, and b with respect to x and y. Rasterizer 24 then generates the values of x and y for each pixel on the interior of each graphics primitive. For each value of x and y, the rasterizer also generates values of z, r, g, and b based on interpolation between values determined by the vertex data records received from geometry processor 22. Each value of x and y corresponds to the address of a depth value in z-buffer 26, as well as to the address of a set of (r, g, b) color values in frame buffer 30. If the generated value of z satisfies a specified condition with respect to the depth value stored at the address implied by x and y (such as z less than depth (x, y)), then the depth value is replaced with the generated z value, contingent to the z write mask, and the values of r, g, and b for that pixel are stored in the corresponding addresses in frame buffer 30. The contents of frame buffer 30 are then used to drive, for example, a set of digital-to-analog converters which generate analog video signals for a cathode ray tube.

GRAPHICS SUBSYSTEM ARCHITECTURES

The present invention may be embodied in many types of graphics subsystems. One reason these subsystems vary is to support different methods for performing lighting calculations such as, for example, either Gouraud shading or Phong shading. Architectures for subsystems according to the present invention that support Gouraud or Phong shading are discussed in greater detail below.

A. Subsystem Supporting Gouraud Shading

Figure 3:
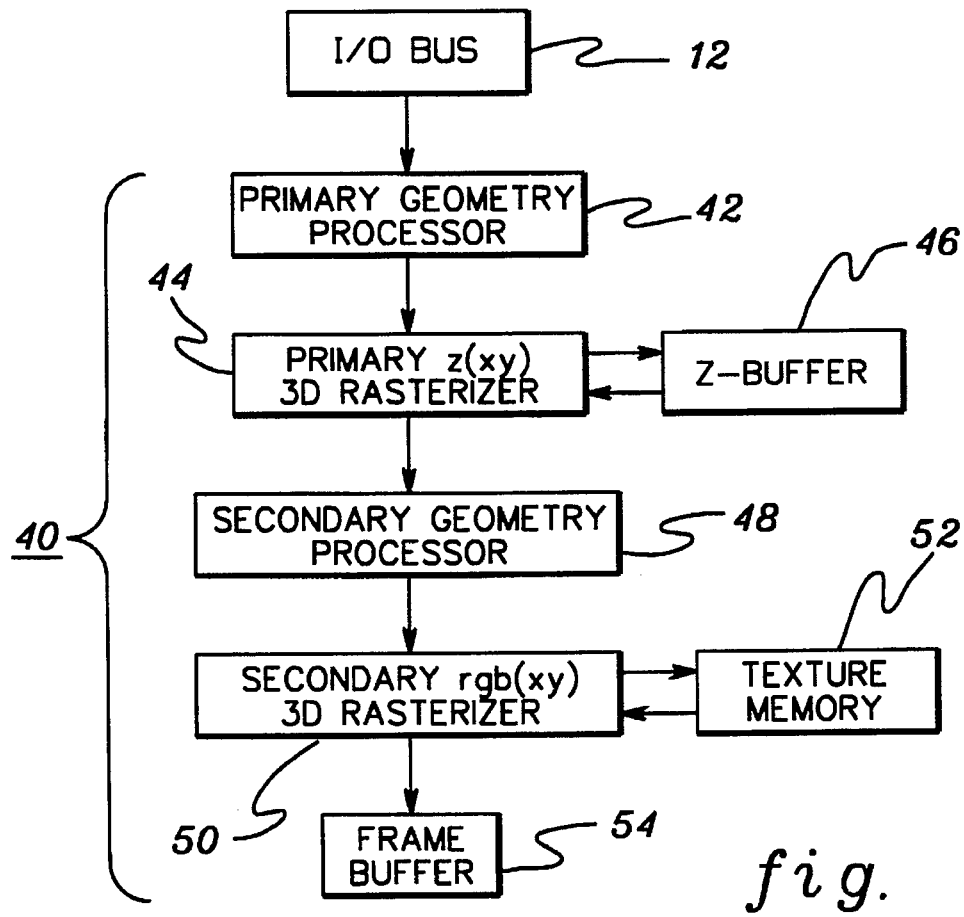
FIG. 3 is a block diagram of a graphics subsystem according to the present invention that supports Gouraud shading.

FIG. 3 is a block diagram that illustrates a graphics subsystem 40 according to the present invention that supports Gouraud shading in which lighting calculations determine color values for each vertex. In contrast to the conventional graphics subsystem 20 shown in FIG. 2, the geometry processor for subsystem 40 has been divided into two parts, a primary geometry processor 42 and a secondary geometry processor 48. Similarly, the rasterizer has been divided into two parts, a primary rasterizer 44 and a secondary rasterizer 48. Input/output bus 12 provides graphics data from host processor 10 (not shown) to primary geometry processor 42. Primary rasterizer 44 is connected to a z-buffer 46, and secondary rasterizer 50 is optionally connected to a texture memory 52. A frame buffer 54 is connected to secondary rasterizer 50.

Primary geometry processor 42 is similar to geometry processor 22 except that the normal vector transformations and lighting calculations are not performed by primary geometry processor 42, thus allowing primary geometry processor 42 to process vertex data records at a higher rate (or using fewer processors) than is possible with a conventional subsystem. The output of primary geometry processor 42 includes coordinate values substantially identical to those of conventional geometry processor 22. However, instead of r, g, b color values obtained from the conventional geometry processor, primary geometry processor 42 simply passes along the unchanged values of the vertex normal vectors and any other data (such as colors or texture coordinates) provided with the vertex data records received from host processor 10. Like the geometry processor in a conventional graphics subsystem, primary geometry processor 22 must perform many floating point operations, and consequently, this component contains one or more floating point processors.

Primary rasterizer 44 is similar to conventional rasterizer 24 of conventional subsystem 20 as shown in FIG. 2 except that only the value of z is interpolated between the vertices, and the color values (r, g, and b) are not interpolated. This allows the same rasterizer to be realized with fewer components, such as, for example, a single interpolator (for z) instead of four interpolators (for z, r, g, and b) as in a conventional rasterizer. Instead of updating the frame buffer following the processing of a primitive which has at least one pixel passing the z-buffer test, as in a conventional rasterizer, primary rasterizer 44 must generate a z-buffer pixel mask, for example, with one bit for every pixel within the interior of each graphics primitive. If a pixel passes the z-buffer test, the pixel is classified as visible by setting its mask bit to 1; otherwise, the pixel is classified as hidden by setting its mask bit to zero. As discussed later, the pixel mask may be implemented as a run-length encoded mask using two registers.

Although not used in the preferred embodiments described in detail later, in other embodiments, primary rasterizer 44 may maintain a signal PASS which is set to zero at the beginning of processing for each graphics primitive. If any pixel has a mask bit set to 1 (i.e. at least one pixel within the primitive has been classified as visible), then the primitive is classified as visible, and PASS is set to 1; otherwise, the primitive is classified as hidden, and PASS remains set at 0. In contrast, in the preferred embodiments described later, the signal PASS is implied from the contents of the two registers used to implement the run-length encoded pixel mask such as, for example, where the register indicating the length of the run of visible pixels for a primitive is equal to zero.

As with a conventional rasterizer, the functions of primary rasterizer 42 are accomplished with one or more integer arithmetic logic units.

Where the pixel mask corresponds to at least one visible pixel for a primitive (or the value of PASS is set to 1), then primary rasterizer 42 provides the following data values to secondary geometry processor 48:

a. Untransformed vertex coordinates b. Untransformed vertex normal vectors c. Any other vertex data (e.g. colors, texture coordinates)

d. Transformed coordinates (prior to clipping)

e. Rasterization setup parameters f. Z-buffer pixel mask

The transformed coordinates are required only if the primitive is clipped, in which case the clipping calculations must be repeated in order to determine the colors and texture coordinates at any new vertices created by clipping. As an alternative, these values may be recomputed by secondary geometry processor 48 based on the untransformed coordinates and the transformation from modelling coordinates to view coordinates previously performed in primary geometry processor 42. The rasterization setup parameters may include any values determined by primary rasterizer 44 which will be useful to computations performed by secondary rasterizer 50. This may include, for example, a key to the vertex sorting results for each primitive as well as the vector product (dx1*dy2−dx2*dy1) calculated for each triangular area component of each primitive by the primary rasterizer. More specifically, dx1=x1−x0, dy1=y1−y0, dx2=x2−x0 and dy2=y2−y0, where (x0, y0), (x1, y1), and (x2, y2) are the coordinates of the three vertices of a triangle. As an alternative, these values may be recomputed by secondary rasterizer 50 based on the clipped coordinates.

Secondary geometry processor 48 transforms the coordinates and normal vectors from modelling coordinates to world coordinates. This transformation may differ from the transformation from modelling coordinates to view coordinates applied in primary geometry processor 42 because view coordinates are defined by applying a viewing transformation to world coordinates after performing the lighting calculations. The resulting transformed coordinates and normal vectors, both in world coordinates, are used to perform lighting calculations to determine vertex colors. These calculations may also be affected by color values provided as optional data for each vertex from the host processor. If a primitive has been clipped by geometry processor 42, the colors and texture values at any new vertices resulting from clipping are determined based on the values determined from lighting calculations for the unclipped vertices. The result of the above lighting calculations is a set of transformed and clipped coordinates with color values and texture values for each vertex of each primitive. In addition, the z-buffer mask calculated by primary rasterizer 44 must be transferred to secondary rasterizer 50 for each area component (such as a triangle) contained within each primitive. If a primitive is a polygon, it is necessary to divide the primitive into a sequence of area components such as triangles within which the color values (r, g, b) and depth values may be determined by linear interpolation.

The transformation, lighting, and clipping functions performed by secondary geometry processor 48 are preferably performed with floating point numbers; consequently, it is important to provide sufficient floating point calculation capacity in this processor.

Secondary rasterizer 50 is similar to primary rasterizer 44 except that interpolation is applied to the color values (r, g, b) instead of the depth (z) values. Secondary rasterizer 50 must generate exactly the same set of pixel values (x and y pixel coordinates) as were generated by primary rasterizer 44. Thus, in the preferred embodiment, substantially the same logic used by primary rasterizer 44 to generate x and y values for pixels is used by secondary rasterizer 50. Computations by secondary rasterizer 50 may be reduced by passing values that were previously calculated and depend only on x and y coordinates from primary rasterizer 44 to secondary rasterizer 50. These computations may include, for example, a key to the vertex sorting performed for each triangle, as well as the vector product (dx1, dy2−dx2*dy1) for each triangle. As an alternative, these values may be recomputed using the same algorithms implemented in primary rasterizer 44.

In addition, if texture mapping is being performed, secondary rasterizer 50 must interpolate texture coordinates from vertex values to pixel values, read the texture values for each pixel from texture memory 52, and use the contents of texture memory 52 to determine the pixel color as appropriate for the selected texturing algorithm. The resulting pixel colors are then stored in frame buffer 54 for all primitives at the addresses determined by the x and y coordinates of each pixel. Graphics orders in the display list determine whether texturing is enabled and sets the contents of the texture memory.

The functions of secondary rasterizer 50 may be accomplished with one or more integer arithmetic logic units in a manner similar to that for primary rasterizer 44.

B. Subsystem Supporting Phong Shading

Figure 4:
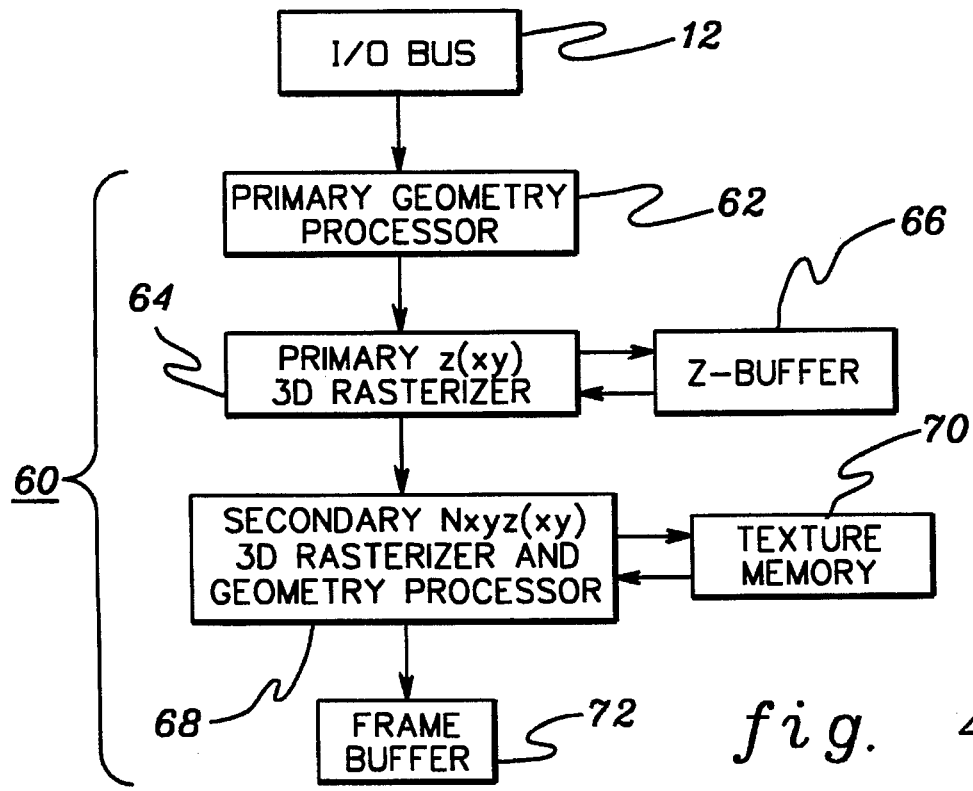
FIG. 4 is a block diagram of a graphics subsystem according to the present invention that supports Phong shading.

FIG. 4 is a block diagram that illustrates a graphics subsystem 60 according to the present invention that supports Phong shading. In contrast to Gouraud shading, in Phong shading the reflectance normal vectors associated with each vertex of a primitive are interpolated across every pixel for that primitive during rasterization and then lighting calculations are performed using the interpolated normal vectors to determine color values for every pixel in the primitive. Because lighting calculations are performed for each pixel, the cost of performing the lighting calculations relative to Gouraud shading increases by the ratio of pixels to vertices, which is typically on the order of 10 to 100. Consequently, the present invention is typically more advantageous for subsystems supporting Phong shading than for those that support Gouraud shading.

Input/output bus 12 provides graphics data from the host processor (not shown) to a primary geometry processor 62 which provides processed data to a primary rasterizer 64 having a z-buffer 66. A combined secondary rasterizer and geometry processor 68 (referred to hereinafter as simply secondary processor 68) receives data from primary rasterizer 64 and has an optional texture memory 70. Secondary processor 68 provides display data to a frame buffer 72.

Primary geometry processor 62, primary rasterizer 64, and z-buffer 66 are designed in a manner substantially identical to the corresponding components of subsystem 40 for supporting Gouraud shading described above, as will be recognized by one skilled in the art. In contrast to subsystem 40, however, within secondary processor 68, the rasterization functions occur before secondary geometry processing functions. For a graphics subsystem that supports Phong shading, and in contrast to one supporting Gouraud shading, the rasterizer in secondary processor 68 must support floating point operations so that positions and normal vectors in world coordinates can be calculated at each pixel based on interpolation between the normal vectors for each vertex for each primitive as stored in the vertex data records. Then the resulting interpolated normal vectors must be renormalized to produce unit vectors prior to performing lighting calculations. Vertex colors and texture coordinates, where used, must also be interpolated from vertex values to pixel values prior to performing lighting calculations, and this interpolation is done in a manner substantially similar to that described for subsystem 40 above.

The resulting pixel colors and normal vectors are then used to perform lighting calculations for each pixel, producing illuminated pixel colors. Next, the interpolated texture coordinates are used to load texture values from the texture memory and the resulting texture values are used to determine the final pixel color in a manner substantially similar to that implemented in subsystem 40 above.

The lighting calculations also require floating point calculations. Since both the rasterizer and secondary geometry processing functions of subsystem 60 require floating point operations, in contrast to subsystem 40 that supports Gouraud shading, these functions are combined in secondary processor 68 since it may use the same floating point processor to perform both geometry processing and rasterization.

LOGIC FLOW DIAGRAMS OF GRAPHICS SUBSYSTEM OPERATION

Figure 5:
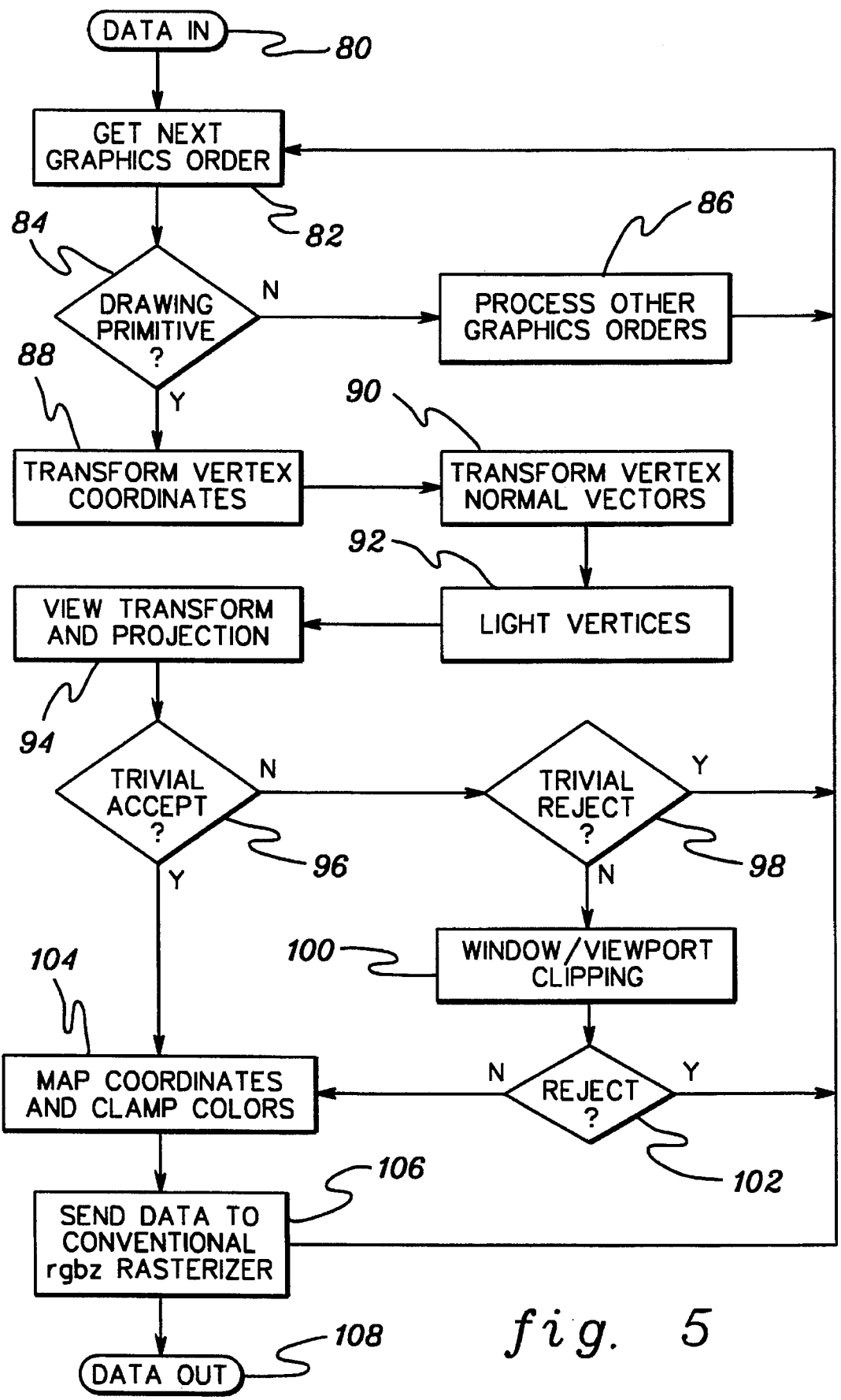
FIG. 5 is a logic flow diagram for a conventional geometry processor.
Figure 6:
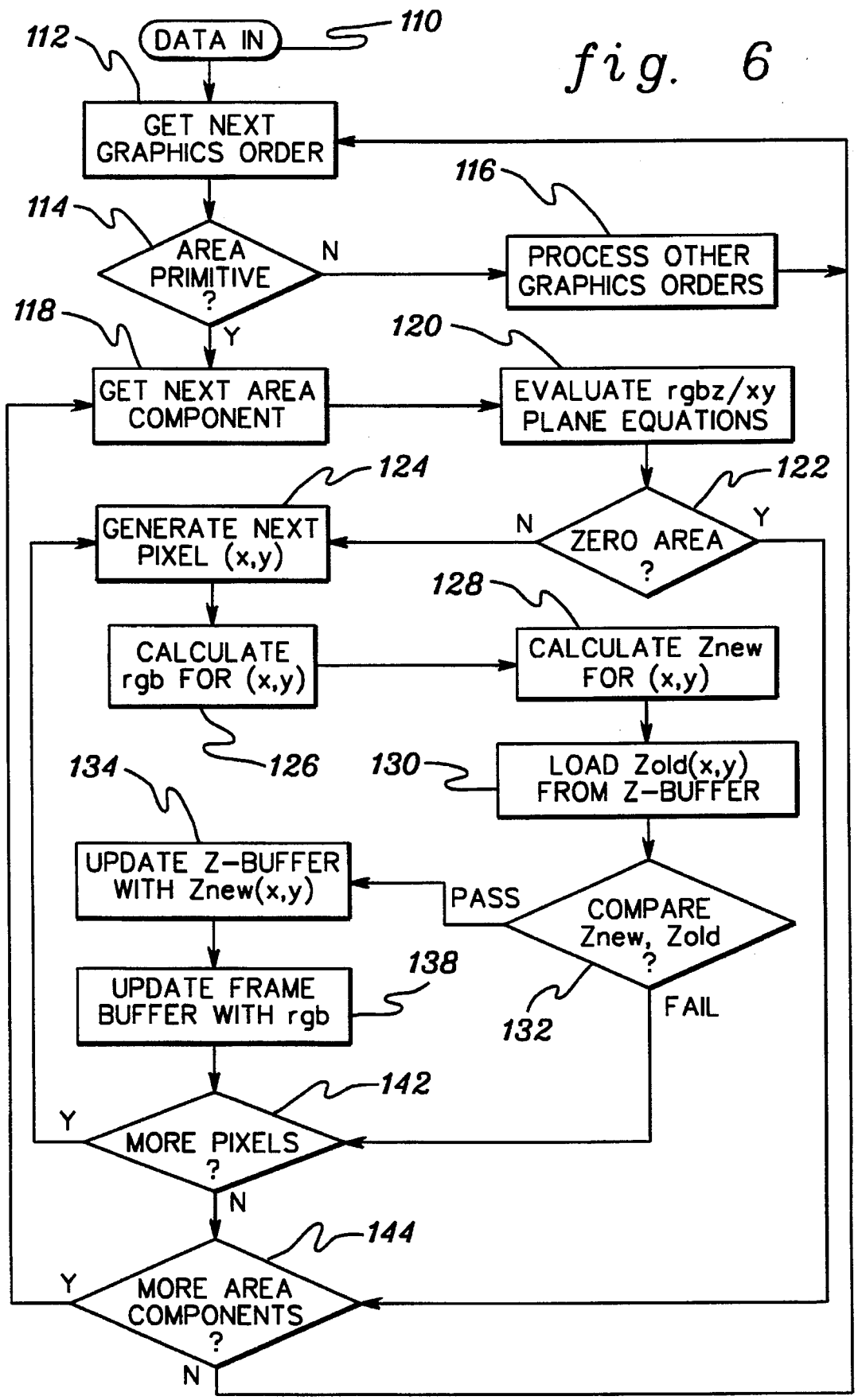
FIG. 6 is a logic flow diagram for a conventional rgbz rasterizer.

For purposes of description and to contrast with the present invention, the operation of a conventional graphics subsystem is first described as illustrated in the steps of the logic flow diagrams of FIGS. 5 and 6. Next, the steps in the operation of the two graphics subsystem architectures for supporting Gouraud or Phong shading according to the present invention are described using the logic flow diagrams presented in FIGS. 7–12. Although several embodiments of the present invention are described in detail below, the practice of the present invention as claimed is not limited to these specific embodiments, but rather may also be implemented in other forms having differences in operation from that described below, as will be recognized by one skilled in the art.

A. Conventional Graphics Subsystem

1. Conventional Geometry Processor

FIG. 5 illustrates a logic flow diagram for a conventional geometry processor. In step 80 the geometry processor accepts a stream of data values transferred from the host processor to the graphics subsystem. This data consists of a sequence of data blocks called graphics orders comprising drawing primitives, transformation matrices, graphics attributes, and other orders as required to control all functions of the graphics subsystem. Each data block begins with a data record identifying which type of order is represented by the data.

The graphics orders are received in step 82 by a process which reads the data received from the host processor and stores this data in registers or memory within the graphics subsystem. In step 84 the data record identifying the type of graphics order is then tested to determine whether the graphics order corresponds to a drawing primitive such as a sequence of vectors (e.g. a polyline), a polygon, or a strip of triangles. If not, then any additional data received with the current graphics order is processed in step 86, as needed, and the geometry processor prepares to receive the next graphics order. Examples of processing that occur in step 86 are the storing of drawing colors, transformation matrices, and light source parameters in appropriate registers within the geometry processor.

Graphics orders corresponding to drawing primitives typically include additional data records containing values of the geometric coordinates (xm, ym, zm) or homogeneous coordinates (xm, ym, zm, wm) for each of a sequence of vertices. If omitted from the data, values of wm=1 and zm=0 may be assumed. In addition, these orders may include data for reflectance normal vectors (nx, ny, nz) for each vertex. The values of these coordinates and normal vectors are assumed to be specified in a coordinate system designated as modelling coordinates.

If the graphics order is identified as a drawing primitive in step 84, then in step 88 the data values within the graphics order presenting geometric coordinates (xm, ym, zm, wm) are subjected to the following 4×4 transformation matrix:

$$xw=t11*xm+t12*ym+t13*zm+t14*wm$$

$$yw=t21*xm+t22*ym+t23*zm+t24*wm$$

$$zw=t33*xm+t32*ym+t33*zm+t34*wm$$

$$ww=t41*xm+t42*ym+t43*zm+t44*wm$$

The values of the matrix t elements t11, t12 . . . t43, t44 are determined by reference to other graphics orders received by the geometry processor. Multiplication by the above matrix has the effect of converting the data values (xm, ym, zm, wm) in modelling coordinates into the values (xw, yw, zw, ww) in a coordinate system designated as world coordinates.

Following the coordinate transformation, in step 90 data representing the reflectance normal vectors (nx, ny, nz) are subjected to a 3×3 transformation matrix, $$nxw=s11*nx+s12*ny+s13*nz$$

$$nyw=s21*nx+s22*ny+s23*nz$$

$$nzw=s33*nx+s32*ny+s33*nz$$

The matrix s is determined by the inverse transpose of the upper left 3×3 portion of the matrix t. This ensures that the vectors represented by (nxw, nyw, nzw) remain perpendicular to the surfaces represented by the transformed coordinates (xw, yw, zw, ww). The resulting normal vectors are then converted into unit vectors by dividing by the norm of (nxw, nyw, nzw) as shown below, where norm is defined as follows:

norm=sqrt(nxw*nxw+nyw*nyw+nzw*nzw)

nxu=nxw/norm nyu=nyw/norm nzu=nzw/norm

In step 92 the transformed coordinates and normal vectors for each vertex are used to evaluate the lighting equations for each vertex. Examples of these equations may be found in standard textbooks such as Computer Graphics: Principles and Practice by Foley et al. These calculations also depend on surface material properties and light source definitions determined by other graphics order. The result of performing lighting calculations is a color (r, g, b) for each vertex. Following lighting calculations, the normal vectors are no longer needed.

After evaluation of the lighting equations, in step 94 the coordinates may be subjected to a 4×4 view transformation as follows:

$$xv=v11*xw+v12*yw+v13*zw+v14*ww$$

$$yv=v21*xw+v22*yw+v23*zw+v24*ww$$

$$zv=v31*xw+v32*yw+v33*zw+v34*ww$$

$$wv=v41*xw+v42*yw+v43*zw+v44*ww$$

This transformation has the effect of converting the coordinates (xw, yw, zw, ww) into a coordinate system designated as view coordinates, in which the z axis corresponds to the direction of view, and the x axis is the horizontal axis perpendicular to the direction of view. The origin of the view coordinates is located in the center of the screen or window, and the w axis is parallel to the z axis with its origin at the eye point. Also in step 94, a perspective projection is accomplished by dividing xv, yv, and zv by wv as follows:

$$xp=xv/wv$$

$$yp=yv/wv$$

$$zp=zv/wv$$

In step 96 the resulting projected coordinates (xp, yp, zp) are tested by comparing each to the range of (−1 to +1). If the coordinates of all vertices within a drawing primitive pass this test, then the primitive is considered to be trivially accepted. In step 98 a the projected coordinates are similarly tested. If all vertices fail this test for the same reason, such as all having xp>1, then the primitive is said to be trivially rejected. If a drawing primitive is trivially rejected, then processing is completed and the geometry processor continues with the next drawing order in step 82.

If a drawing primitive is neither trivially accepted nor trivially rejected, it is subjected to window/viewport clipping in step 100. This involves determining the points where the edge of a drawing primitive cross the window/viewport boundaries (+1 or −1). Other attributes, such as vertex colors determined by the lighting equations must be interpolated to these crossing points. The result is a modified drawing primitive determined by the intersection of the original drawing primitive and the three-dimensional view volume corresponding to $(-1<=xp<=1, -1<=yp<=1, -1<=zp<=1)$. In some cases, normalized coordinates ranging from 0 to 1 may be used instead. In step 102 if the resulting modified drawing primitive corresponds to a null extent, then the primitive is rejected and processing continues with the next graphics order in step 82. Otherwise processing continues with step 104.

In step 104 modified drawing primitives resulting from window/viewport clipping, as well as trivially accepted drawing primitives, are then subjected to coordinate mapping and color clamping operations. The coordinate mapping consists of scaling and translating the coordinate values so as to correspond to pixel coordinates and depth values, as required by the subsequent rasterization hardware and as shown in the following equations:

$$xmap=mx1*xp+mx2$$

$$ymap=my1*yp+my2$$

$$zmap=mz1*zp+mz2$$

The resulting mapped coordinates are then converted from floating point representations to integer values.

Color clamping involves limiting each component of each color value to some maximum value such as +1 to give clamped colors (r, g, b). The resulting clamped colors are then scaled to range such as 0 to 255 and converted from floating point form to integer values.

In step 106 the resulting mapped coordinates and clamped colors are transferred to the rasterizer for further processing. The geometry processor then returns to step 82 and continues with the next graphics order. The data transferred to the rasterizer in step 108 consists of the transformed, projected, clipped, and mapped coordinates (xmap, ymap, zmap) and the clamped color values (nr, ng, nb) for each vertex.

2. Conventional rgbz Rasterizer

FIG. 6 illustrates the operation of a conventional rgbz rasterizer. In step 110 the rasterizer accepts the stream of data values transferred from the geometry processor. This data consists of a sequence of command and data records. The command records control the operational modes of the rasterizer, including enabling the use of the z-buffer, selecting the z-buffer comparison test, and determining whether the data records are to be interpreted as vectors, polygons, triangle strips or other drawing primitives.

The command and data records are received by a process in step 112 which loads records received from the geometry processor and stores their values in registers or memory within the rasterizer. The current operational mode, as determined by previous command records, is then tested in step 114 to determine whether the current operational mode corresponds to an area primitive such as a polygon or triangle strip. If so, the processing continues to step 118. Otherwise, the data is processed by appropriate alternative procedures in step 116, and then processing returns to step 112. In some cases, such as the drawing of vectors, the procedures performed in step 116 may be similar to some of the other steps illustrated in FIG. 6 and described below.

If the current operational mode corresponds to an area primitive, processing continues to step 118, and the area defined by the subsequent data records may be subdivided into elementary area components such as triangles or trapezoids, depending upon the means used to interpolate values from vertices to pixels. For the sake of description, this description assumes that each primitive is divided into a sequence of triangles. Each of the resulting area components is then subjected to a set of preliminary calculations in step 120. These calculations typically involve sorting vertices of the components with respect to x or y, classifying the shape (e.g. as having clockwise or counterclockwise vertex ordering), and evaluating derivatives of color values (r, g, b) and depth values (z) with respect to x and y (in other words, evaluating the plane equations). The resulting derivatives may be designated by dr/dx, dr/dy, dg/dx, dg/dy, db/dx, db/dy, dz/dx, and dz/dy. These calculations form a substantial computational burden for the rasterizer, especially for small triangles having less than 100 pixels.

In step 122, where the process of classifying an area component and evaluating the plane equations determines that an area component has zero area because of coincident or colinear vertex coordinates, no further processing for this component is required. Processing continues to step 144, and if there is another area component, then processing continues with step 118. Otherwise, the next graphics order is retrieved in step 112.

If an area component is not found to have zero area in step 122, then in step 124 a process is initiated to generate all of the pixels comprising the interior of the area component. This process is based on the values determined by sorting and classification of the area component. Each of the resulting pixels is defined by an x value corresponding to a column (horizontal position) on a graphics display, and a y value corresponding to a row (vertical position) on a graphics display. Each pair of x and y values corresponds to a unique address in a block of memory called the frame buffer. Each pair of x and y values also corresponds to a unique address in a second block of memory called the z-buffer. The logic used to generate a sequence of pixel values (x and y pairs) typically divides an area component into a sequence of rows (y values). Each row is then divided into a sequence of pixels (x values).

In step 126, as each pixel is generated, the corresponding color values r(x, y), g(x, y), and b(x, y) are calculated. These values are determined by the area classification logic. Each component is then incremented by dq/dy, where q=r, g, b, for each successive row determined by the pixel generation logic. Each component is also incremented by dq/dx for each successive pixel within a row as determined by the pixel generation logic. In step 128, equivalent logic, as will be recognized by one skilled in the art, is used to calculate the depth value Znew for each pixel determined by the pixel generation logic.

In step 130 the value of Zold for each pixel is determined by loading the contents of the z-buffer located at the address defined by the values of x and y for the current pixel. In step 132 this value is compared to the value of Znew based on the current z-buffer comparison test. The basis of comparison may be defined by Znew>Zold, Znew<=Zold, or otherwise, depending upon the current operating mode selected in the rasterizer.

If the value of Znew passes the z-buffer comparison test, then in step 134 the value of Znew is stored in the z-buffer at the address determined by the values of x and y, thereby replacing the value of Zold used in the z-buffer comparison test. In addition, in step 138, the current color values (r, g, and b) are stored in the frame buffer at addresses determined by the values of x and y. However, if the value of Znew fails the z-buffer comparison test in step 132, then the z-buffer and frame buffer are not updated and processing continues to step 142.

Following the z-buffer comparison test and the conditional updates to the z-buffer and frame buffer, in step 142, if there are more pixels within the current area component, then processing continues with step 124. Otherwise, in step 144, if there are more area components within the current graphics order to process, then the next area component is retrieved in step 118. If there are no more area components, then the next graphics order is retrieved in step 112.

The operation of updating the frame buffer in step 138 may include a wide variety of functions beyond simply replacing the current contents of a specific address with new color values. For example, this may involve adding the new color values to the previous contents, replacing the current contents with a linear combination of the new and old value (known as alpha blending), or replacing the current contents with the result of logical operations (e.g. and, or, xor) involving the current contents of the frame buffer and the new values. These operations may also be subject to masking operations which inhibit changes to various pixels or sets of bits within each pixel. In addition, the color values determined by interpolation between vertices may be further modified by means such as texture mapping based on texture coordinates interpolated between vertices. Likewise, the operation of updating the z-buffer may also be subject to any number of further qualifications, as recognized by one skilled in the art, including masks which prevent some or all elements of the z-buffer from being modified.

B. Subsystem Supporting Gouraud Shading

A graphics subsystem according to the present invention is now described and contrasted with the conventional subsystem described above. In the following description for a subsystem that supports Gouraud shading, and also for the later description of a system that supports Phong shading, the color values of pixels and vertices are described in terms of (r, g, b) triples. However, this choice represents only one of many possible means of representing such colors and is chosen here for purposes of description. In other embodiments of the present invention, for example, the colors may have more than or less than three components, or the colors may be represented in terms of components such as hue, saturation, and value, etc., instead of as additive primaries.

The operation of a primary geometry processor and primary rasterizer are described first. The operation for both of these components is substantially identical for subsystems that support Gouraud or Phong shading, and therefore, their operation is described in this section only.

1. Primary Geometry Processor

Figure 7:
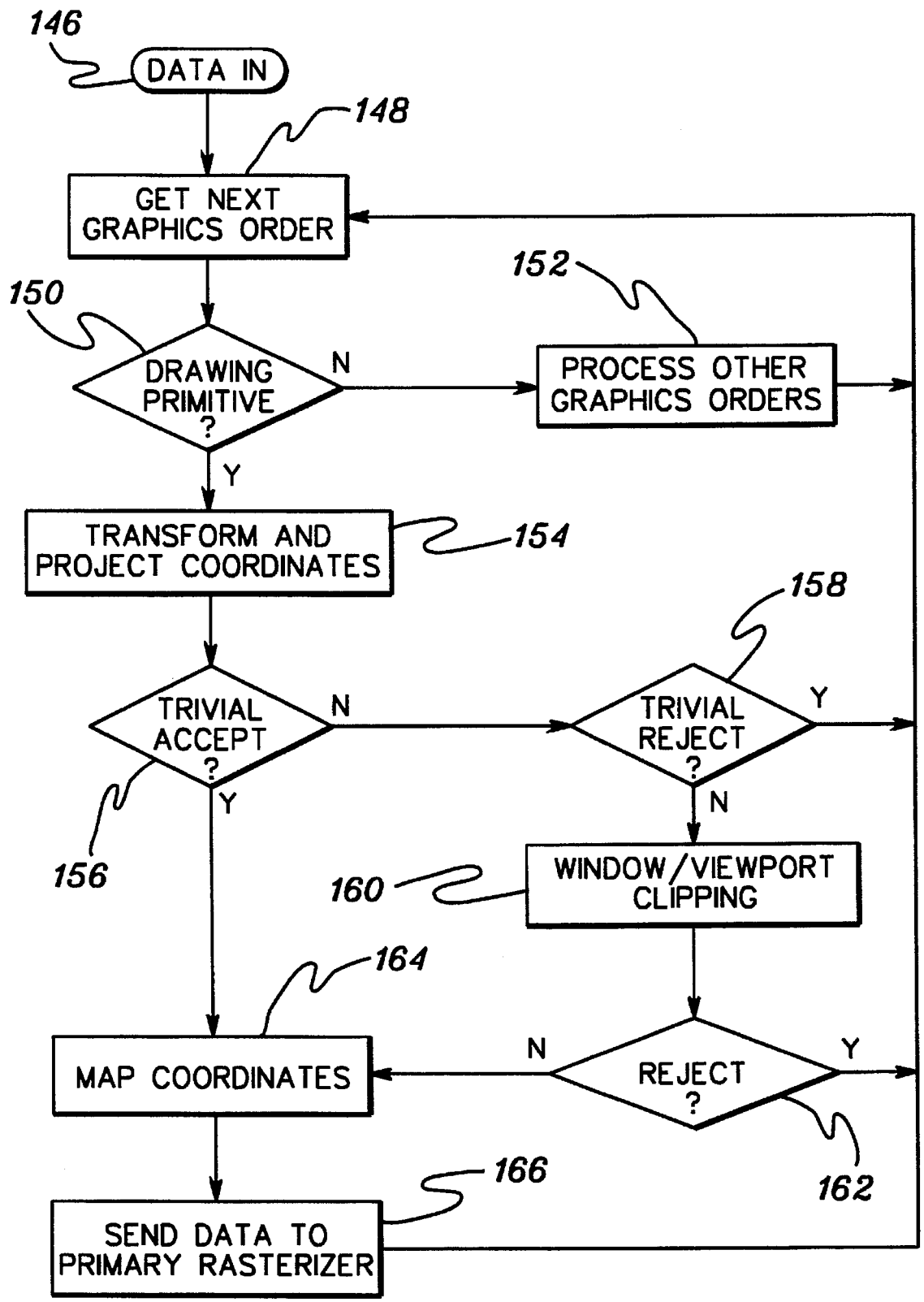
FIG. 7 is a logic flow diagram for a primary geometry processor for a graphics subsystem according to the present invention that supports Gouraud or Phong shading.

FIG. 7 illustrates the operation of a primary geometry processor for a graphics subsystem that supports Gouraud or Phong shading. The operation of the primary geometry processor is similar to that of the conventional geometry processor, and the significant differences necessary for the practice of the invention are described below, as will be recognized by one skilled in the art.

In step 146 data values are transferred from the host processor. In step 148, the next graphics order is processed. In step 150, if the graphics order corresponds to a drawing primitive, then processing continues to step 154. Otherwise, processing branches to step 152 to process the graphics order as appropriate, and then to step 148 to process the next graphics order.

In step 154, unlike the conventional geometry processor, the normal vector transformation and vertex lighting calculations have been eliminated, and the view transformation and projection has been combined with the transformation from modelling coordinates to world coordinates. The resulting combined transformation is based on the direct transformation of coordinates (xm, ym, zm, wm) from modelling coordinates to view coordinates (xv, yv, zv, wv) as follows:

$$xv=tv11*xm+tv12*ym+tv13*zm+tv14*wm$$

$$yv=tv21*xm+tv22*ym+tv23*zm+tv24*wm$$

$$zv=tv31*xm+tv32*ym+tv33*zm+tv34*wm$$

$$wv=tv41*xm+tv42*ym+tv43*zm+tv44*wm$$

This operation is based on 4×4 transformation matrix tv determined by the matrix product of the matrices t and v used in steps 88 and 94 in the conventional geometry processor. This one-step transformation from modelling coordinates to view coordinates is possible because the intermediate values (xw, yw, zw, ww) in world coordinates are needed only for lighting calculations, which have been eliminated in the primary geometry processor according to the present invention.

In steps 156 and 158, the drawing primitive is tested to determine whether it is trivially accepted or rejected. If it is not trivially accepted, but is trivially rejected, then processing continues with the next graphics order in step 148. If the primitive is neither trivially accepted nor rejected, then it is subjected to window/viewport clipping in step 160. In step 162, if the resulting primitive corresponds to a null extent, then the primitive is rejected. Otherwise, processing continues to step 164 for coordinate mapping. The clamping of color values required by the conventional geometry processor is eliminated in the primary geometry processor.

In step 166, appropriate data is sent to the primary rasterizer. This data must include the original untransformed vertex coordinates and normal vectors, in addition to the transformed, clipped, and mapped coordinate values, as are similarly transferred from the conventional geometry processor to the conventional rgbz rasterizer. The data for each vertex must also include a clipping code with one bit indicating whether the vertex is an original vertex or a new vertex generated by the clipping logic, plus six bits corresponding to the six window/viewport clipping boundaries. For each original vertex, each boundary bit indicates whether or not the vertex passed the corresponding clipping test. For each new vertex, each boundary bit indicates whether or not the vertex was created by the corresponding clipping plane.

The simplification of the geometry processor according to the present invention makes it possible for the primary geometry processor to process drawing primitives more rapidly than is possible with a conventional geometry processor because the number of operations required for each vertex is considerably reduced, including the elimination of the costly lighting calculations which often dominates the operation of the conventional geometry processor.

2. Primary Rasterizer

Figure 8:
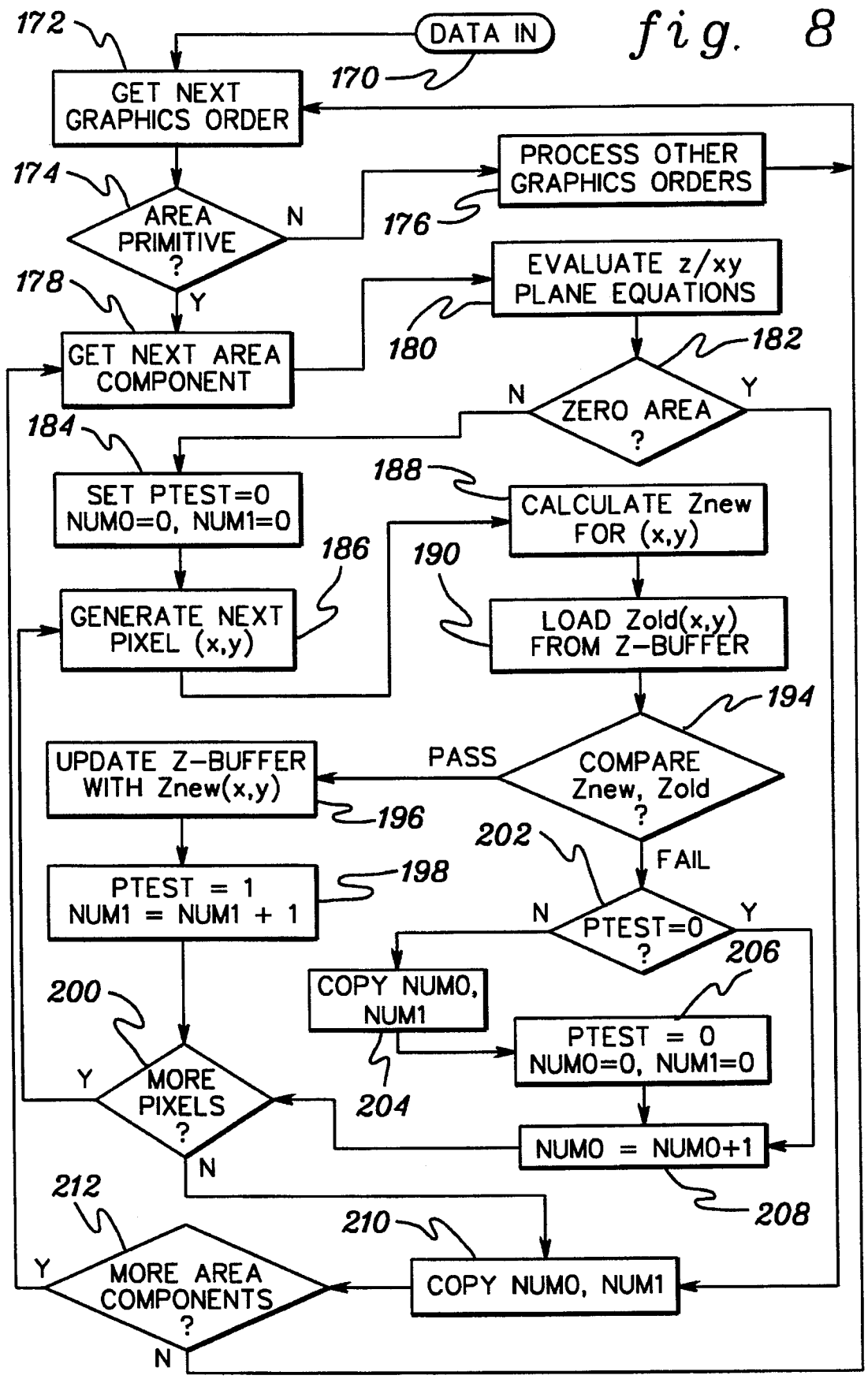
FIG. 8 is a logic flow diagram for a primary rasterizer according to the present invention that supports Gouraud or Phong shading.

FIG. 8 illustrates the operation of a primary rasterizer according to the present invention. The operation of the primary rasterizer is similar to that of the conventional rasterizer. However, for the primary rasterizer, calculations based on the color values (r, g, b) are eliminated, and a z-buffer pixel mask is created and passed on to the secondary rasterizer, as described previously and in more detail below. In addition, data representing the geometry (such as coordinates, normal vectors, etc.) and other properties (such as colors, texture coordinates, etc.) of each vertex, as well as the z-buffer pixel mask for each area component (such as a triangle) contained within each primitive, must be passed to the secondary geometry processor and secondary rasterizer.

In step 170 a stream of data values is accepted from the primary geometry processor, and in step 172 the next graphics order in this stream is processed. In step 174 the operational mode of the primary rasterizer is tested. If this mode corresponds to an area primitive, then an area component of the area primitive is selected for processing in step 178. Otherwise, the data is processed by appropriate alternative procedures in step 176.

Any data representative of the primitive geometry such as untransformed coordinates, reflectance normals, and clipping codes are transferred to the secondary geometry processor when received as part of each area component in step 178. In addition, the x and y components of the transformed and clipped vertices are passed along to the secondary geometry processor, and the clipping codes associated with any new vertices created by the clipping logic are passed along to the secondary geometry processor. In contrast to a conventional rasterizer, it is not necessary to pass the z components of the transformed and clipped vertices to the secondary geometry processor.

In step 180, preliminary calculations are performed that are similar to that of step 120 for a conventional rasterizer except that calculations based on color values are eliminated. Thus, for example, the evaluation of the plane equations is reduced to a treatment of z (depth) as a function of x and y. In step 182, if an area component has zero area, then in step 210 the contents of the registers NUM0 and NUM1 are copied to the data communications path leading to the secondary geometry processor. This sends the values of NUM0=0 and NUM1=0 to the secondary geometry processor, which will require at least one such pair for each area component. The value of NUM1=0 indicates that the area component can be skipped.

Otherwise, in step 184, a 1-bit flag PTEST and registers NUM0 and NUM1 are cleared prior to generating pixels for each area component. The purpose of the flag PTEST is to indicate whether or not the previous pixel has passed the z-buffer test. When PTEST=1, the previous pixel in the current area component has passed the z-buffer test, and when PTEST=0, either the previous pixel has failed the z-buffer test, or this is the first pixel in the current area component.

Registers NUM0 and NUM1 are used to construct a run-length encoded z-buffer pixel mask for each area component. The register NUM0 indicates the number of consecutive pixels which have failed the z-buffer test either from the last pixel to pass the z-buffer test or from the beginning of the current area component (if no pixels have yet passed the z-buffer test). The value of NUM1 indicates the number of consecutive pixels that have passed the z-buffer test either from the last pixel to fail the z-buffer test or from the the beginning of the current area component (if no pixels have yet failed this test).

In step 186 a process is started to generate pixels for each area component, and the next pixel is generated. In step 188, Znew is calculated for the pixel generated in step 186. In contrast to a conventional rasterizer, the calculation of color values (r, g, b) for each pixel is eliminated. In step 190 the value of Zold is loaded from the z-buffer, and in step 194 a comparison is made for the values of Znew and Zold. If the current pixel passes this comparison, then in step 196 the z-buffer is updated with the new value of Znew for the current pixel. Next, in step 198 the value of PTEST is set to 1 and the value of NUM1 is incremented by 1. NUM1 is used to count the number of pixels that pass the z-buffer test (in other words, the number or pixels that are visible). NUM1, along with NUM0, provides a classification scheme based on run-length encoding to pass information to the secondary geometry processor regarding which pixels are classified as visible. In step 200 if there are more pixels to process for the current area component, then the next pixel is generated in step 186. Otherwise, in step 210 the contents of the registers NUM0 and NUM1 are copied to the data communications path leading to the secondary geometry processor.

If the comparison in step 194 is failed, then in step 202 the value of the flag PTEST is tested. The flag PTEST indicates whether any of the previously processed pixels for the current area component have been classified as visible by the z-buffer comparison, but have not yet had the data corresponding thereto sent to the secondary geometry processor.

If PTEST is equal to 0, then processing proceeds to step 208 where the value of NUM0 is incremented. The value of NUM0 is used to count the number of pixels that fail the z-buffer test (in other words, that are classified as hidden). The value of NUM0, along with NUM1, is used to pass information, by a run-length encoding scheme, regarding the classification of pixels for the current area component to the secondary geometry processor. It should be noted that the value of NUM0 will be incremented for each pixel that fails the z-buffer comparison.

On the other hand, in step 202, if PTEST is equal to 1, then in step 204 the contents of the registers NUM0 and NUM1 are copied to the data communications path leading to the secondary geometry processor, and in step 206, the values of PTEST, NUM0, and NUM1 are all cleared to prepare for further processing of the current area component. Processing continues to step 208 where the value of NUM0 is incremented by 1 to indicate that the current pixel failed the z-buffer test of step 94.

Following step 208, processing continues to step 200, and if there are no more pixels for the current area component, then in step 210 the contents of the registers NUM0 and NUM1 are copied to the data communications path leading to the secondary geometry processor. Otherwise, in step 186, the next pixel for the current area component is generated. An important purpose for step 210 is to provide data to the secondary geometry processor for any pixels that passed the z-comparison test and were not followed by a pixel that failed this test (in this case, data for these pixels would not be sent by step 204).

Following step 210, in step 212, if there are more area components to process in the current graphics order, then processing continues to step 178. Otherwise, processing continues to step 172 to get the next graphics order from the primary geometry processor.

As mentioned above, the values of NUM0 and NUM1 that are transferred to the secondary geometry processor form a run-length encoded representation of the pixel mask. The secondary rasterizer uses the same logic to generate the x and y values for the pixels in each area component as the primary rasterizer. Thus, the pixel mask need only pass the appropriate numbers of consecutive visible or hidden pixels using NUM0 and NUM1. Because in most cases, all pixels within each area component are expected to be either completely accepted (in which case NUM0=0 and NUM1= number of pixels in area component) or completely rejected (in which case NUM0=number of pixels in area component and NUM1=0), it is expected that run-length encoding of the pixel mask will provide for efficient operation of the primary rasterizer.

3. Secondary Geometry Processor

Figure 9:
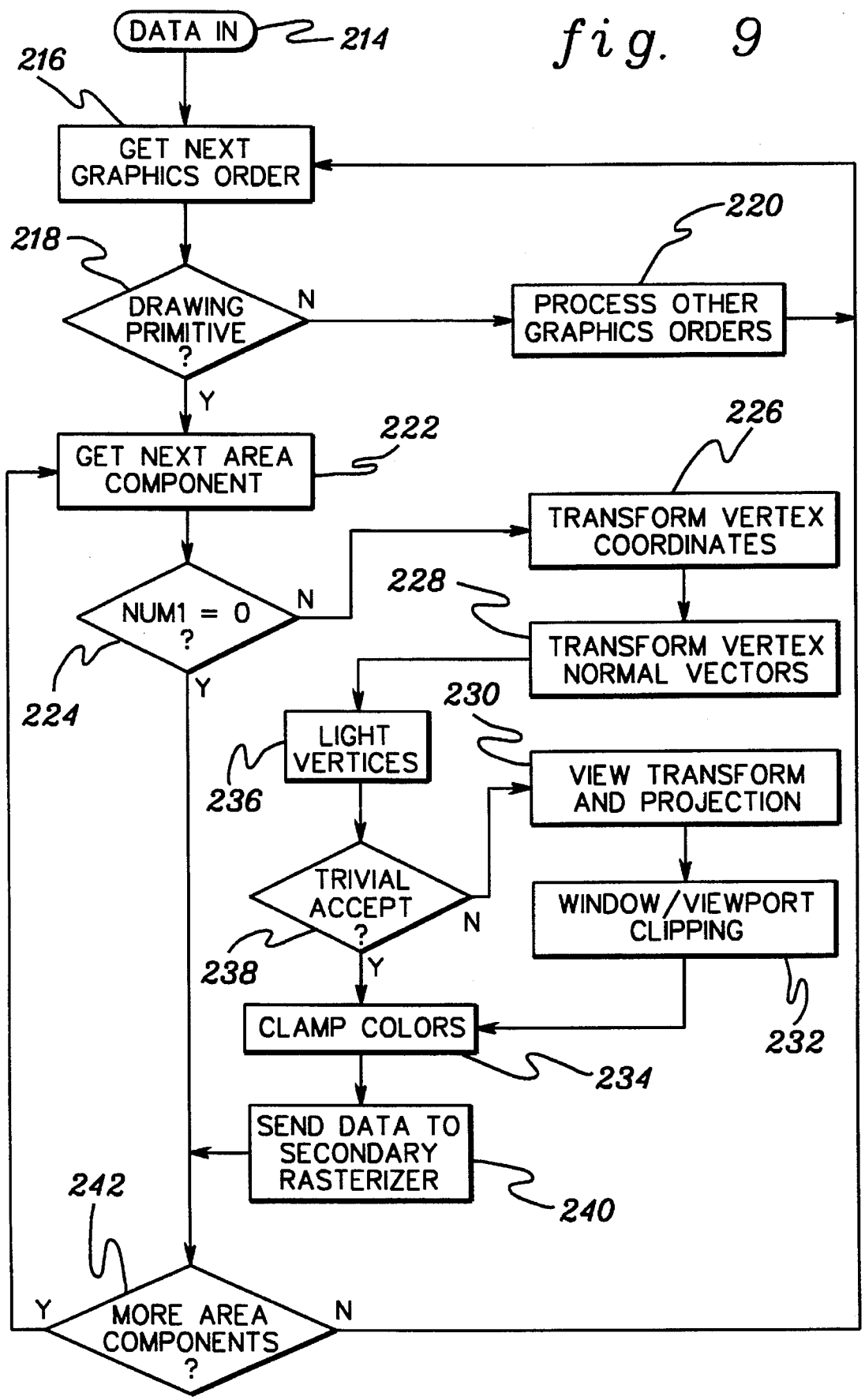
FIG. 9 is a logic flow diagram for a secondary geometry processor according to the present invention that supports Gouraud shading.

FIG. 9 illustrates the operation of a secondary geometry processor according to the present invention. The operation of the secondary geometry processor is similar to that of the conventional geometry processor, except that the transformation and lighting calculations are contingent on the corresponding area components having a non-zero area (in other words, contingent on at least one pixel of the area component being classified as visible by the z-buffer comparison in the primary rasterizer).

In step 214 a data stream is accepted from the primary rasterizer which includes data for each drawing primitive consisting of untransformed vertex coordinates, untransformed normal vectors, transformed clipped and mapped vertex coordinates (x and y components), and clipping codes. In addition, a run-length encoded pixel mask accompanies the vertex data records for each area component. These pixel masks are represented by sequences of integers (NUM0, NUM1, NUM2, NUM3, . . . , NUMi) alternately specifying the number of pixels classified as hidden (rejected) or visible (accepted) by the z-buffer comparison test in the primary rasterizer.

In general, a pixel mask will accompany each area component. In the case of a polygon, for example, the first two vertices (vo and v1) do not form an area component. However, the third vertex (v2) specifies the first area component (defined by v0, v1, and v2), and it is accompanied by a pixel mask. Each subsequent vertex (vi) specifies an additional area component defined by (v0, v(i−1), and vi), along with a corresponding pixel mask. Likewise, for a triangle strip, each new vertex (vi) after the second vertex specifies a new area component defined by vertices (v(i−2), v(i−1), and vi).

In step 216, the next graphics order in the data stream is retrieved. In step 218, if the graphics order corresponds to a drawing primitive, then in step 222 the first area component for this primitive is retrieved. Otherwise, in step 220, other appropriate processing is performed, and processing continues in step 216.

Following step 222, in step 224 a test is performed to determine if the current primitive has a non-zero area (i.e. is the current primitive visible?). Specifically, the value of NUM1 (which is the second word of the pixel mask; NUM0 is the first word thereof) indicates the number of pixels in the first group of pixels to pass the z-buffer test (i.e. the length of the visible pixel run). If NUM1=0, then the corresponding area component has no pixels which pass the z-buffer test and processing continues to step 242. In this case, the transformation and lighting calculations are skipped. If NUM1 is not zero, then at least one pixel within the corresponding area component passes the z-buffer test, and processing continues to step 226.

In steps 226, 228, and 236, the new vertex (vi) is subjected to transformation and lighting calculations equivalent to those implemented in the conventional geometry processor at steps 88, 90, and 92. If the current area component is dependent on any preceding vertices (v0, v(i−2), or v(i−1)) which have not been subjected to the transformation and lighting calculations, then these calculations are also performed for these vertices. These transformation and lighting calculations are performed only on the original vertices, not those produced by clipping. If an area component is defined by a new vertex defined by prior window/viewport clipping in step 160, the transformation and lighting calculations are performed for the corresponding set of original vertices.

In step 238, if the vertices which define the current area component are not trivially accepted as indicated by the corresponding clipping codes, the vertex coordinates are subjected to a view transformation and projection in step 230 substantially equivalent that applied in the conventional geometry processor at step 94. The resulting transformed and projected vertices are then subjected to window/viewport clipping logic in step 232 substantially equivalent to that of the conventional geometry processor in step 100. This clipping logic produces color values interpolated between the original vertices, as well as clipped coordinates, in which case only the resultant interpolated colors are retained, and the clipped coordinates are discarded.

In step 234 the vertex color values are clamped, and the vertex color values resulting from the lighting calculations and window/viewport calculations are combined with the transformed, clipped, and mapped vertex coordinates calculated by the primary geometry processor. Color values for accepted vertices are determined and associated with coordinates of the original vertices in step 236. In a trivially accepted area component, all vertices are accepted. In step 240 the resulting sets of data values are sent to the secondary rasterizer. In step 242, if there are more area components for the current primitive, then processing continues to step 222. Otherwise, in step 216, the next graphics order is retrieved.

4. Secondary Rasterizer

Figure 10:
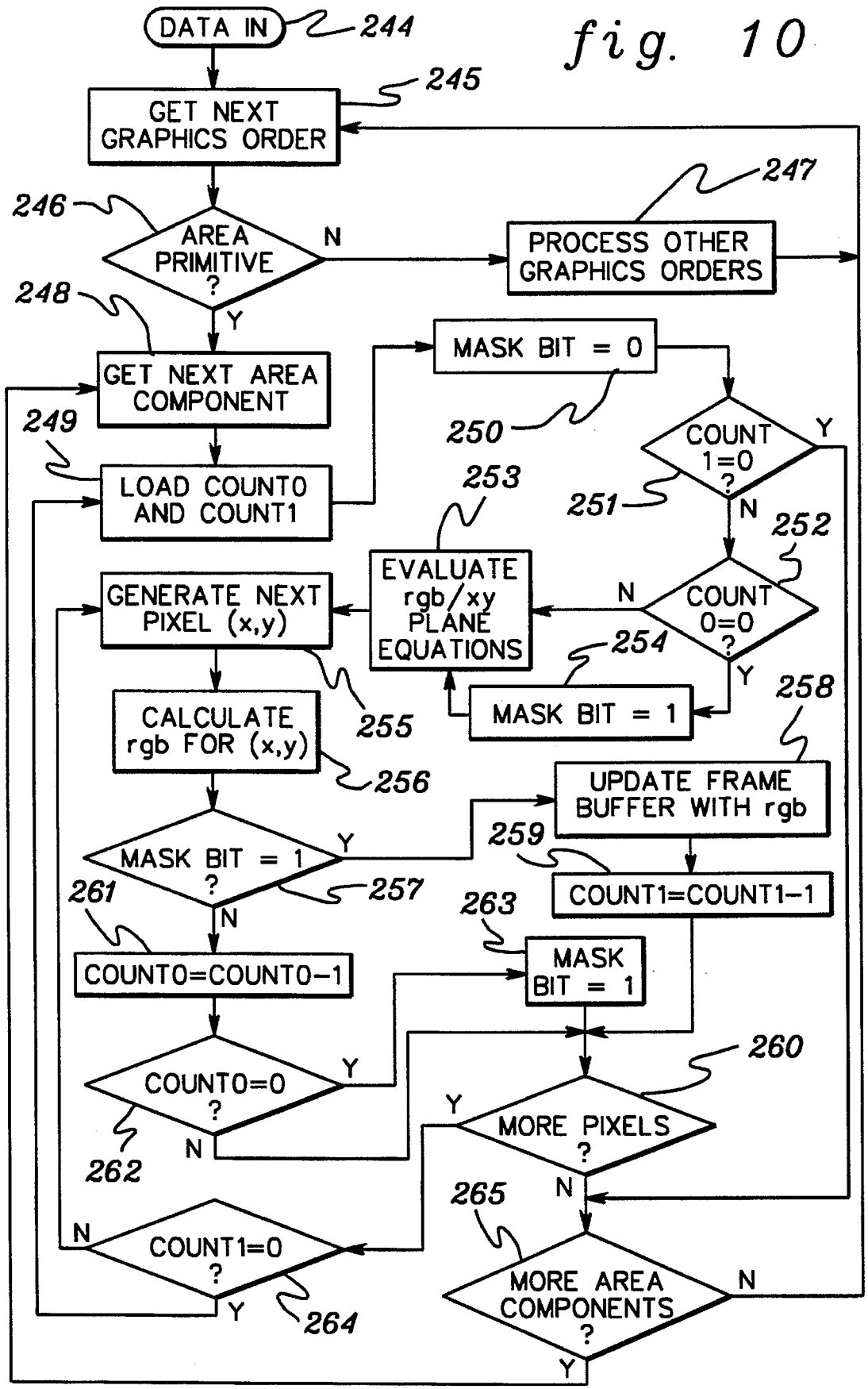
FIG. 10 is a logic flow diagram for a secondary rasterizer according to the present invention that supports Gouraud shading.

FIG. 10 illustrates the operation of a secondary rasterizer according to the present invention. The operation of the secondary rasterizer is substantially similar to that of the conventional rgbz rasterizer, except that the plane equations are not evaluated for z as a function of x and y, the value of Znew is not calculated for each pixel, and the run-length encoded pixel mask generated by the primary rasterizer is used to control the frame-buffer updates.

In step 244 a data stream is accepted from the secondary geometry processor, and in step 245 the next graphics order is retrieved. If this order corresponds to an area primitive, then in step 248 the next area component of this primitive is retrieved. Otherwise, in step 247, other appropriate processing is performed, and then the next graphics order is retrieved in step 245.

Two counters, COUNT0 and COUNT1, and a 1-bit flag MASK are used to define a pixel mask that controls updates to the frame buffer. In general, the frame buffer will only be updated for pixels earlier classified as visible. Pixels classified as visible correspond to a 1 in the pixel ordering, and pixels classified as hidden correspond to a 0 in the pixel ordering. As one specific example, the classification of pixels as hidden or visible might be represented by alternating runs of one's and zero's as follows:
00000000111111111111110000001111110000101001
The corresponding pixel mask for this pixel ordering would contain pairs of integers indicating the length of the runs of zero's and one's in the pixel sequence. In this case, COUNT0 and COUNT1 will take on the following sequence of values: (8, 14), (6, 5), (4, 1), (1, 1), (2, 1).

Generally, the state of the pixel mask is determined by initially setting MASK to 0, and COUNT0 is loaded with the value of the first integer in the pixel mask data for the current area component. Also, COUNT1 is loaded with the value of the second integer in the pixel mask data for the current area component. If COUNT0 is zero, then MASK is set to 1, which corresponds to the end of a run of 0s (i.e. the beginning of a run of 1s) in the pixel mask (e.g. 00000000000001111111111111). Otherwise, MASK remains set at 0, which corresponds to a run of 0s of length equal to at least 1 (e.g. 1111111111100000000). For each successive pixel, if MASK is 0, then COUNT0 is decremented by 1. When COUNT0 reaches zero, MASK is set to 1. On the other hand, if MASK is 1, then COUNT1 is decremented. When COUNT1 reaches zero, MASK is set to 0. If the pixel generation logic indicates that additional pixels remain to be generated, and COUNT1 is zero (note that COUNT0 is zero at this point), then the next pair of (NUM0, NUM1) values are loaded into the COUNT0 and COUNT1 registers.

The use of the pixel mask in the operation of the secondary rasterizer is now discussed in greater detail with reference to FIG. 10. In step 249, COUNT0 and COUNT1 are loaded with the next values in the pixel mask, and in step 250, MASK is set to 0. In step 251, if COUNT1 is zero, then processing for the current area component is terminated because none of the pixels in the current area component passed the z-buffer comparison test (i.e. the component is hidden). In step 252, if COUNT0 is zero, then in step 254, MASK is set to 1. Otherwise, in step 253 plane equations are evaluated for r, g, and b as functions of x and y.

In step 255, the x and y values for the pixels in each area component are generated using exactly the same logic used in the primary rasterizer, so that the pixel mask corresponds properly to the pixel ordering in the secondary rasterizer. In step 256, r, g, and b values are calculated for the current pixel. In step 257, if MASK is 1, then in step 258 the frame buffer is updated with the r, g, b and other data corresponding to the current pixel, and in step 259 COUNT1 is decremented. Otherwise, if MASK is zero, then in step 261, COUNT0 is decremented. In steps 262 and 263, if COUNT0 is zero, then MASK is set to 1. Otherwise, processing continues to step 260.

In step 260, if there are more pixels for the current area component, then in step 264 the value of COUNT1 is tested. If COUNT1 is zero, then the next area component is retrieved in step 248. Otherwise, COUNT0 and COUNT1 are loaded with the next values from the pixel mask in step 249.

In step 260, if there are no more pixels, then processing continues to step 265. If there are more area components for the current primitive, then the next component is retrieved in step 248. Otherwise, the next graphics order is retrieved in step 245.

C. Subsystem that Supports Phong Shading

As discussed above, a graphics subsystem that supports Phong shading uses a primary geometry processor and primary rasterizer that are substantially similar to those used in a subsystem that supports Gouraud shading, and therefore, no additional description for primary processing is provided here.

The operation of a secondary processor for a subsystem that supports Phong shading is discussed below. Although, as discussed previously, the secondary processor is preferably implemented as one unit, for purposes of description the operations of geometry processing and rasterization in the secondary processor are discussed separately below.

1. Secondary Geometry Processor

Figure 11:
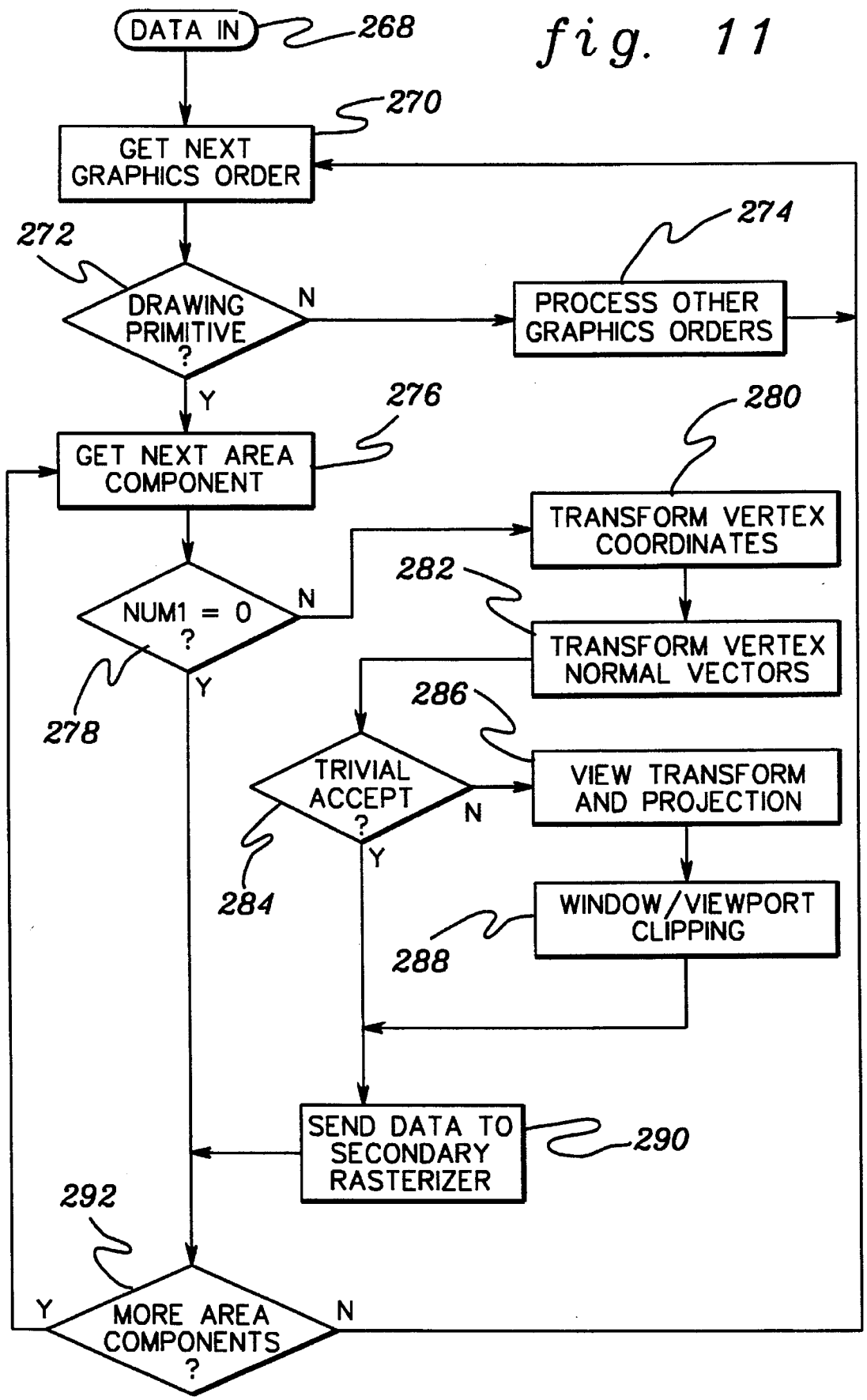
FIG. 11 is a logic flow diagram for a secondary geometry processor according to the present invention that supports Phong shading.

FIG. 11 illustrates the operation of a secondary geometry processor according to the present invention. The operation of the secondary processor for Phong shading is similar to that of the secondary geometry processor for Gouraud shading except that no lighting calculations are performed and the data passed to the secondary rasterizer includes vertex coordinates and reflectance normals in world coordinates, rather than vertex color values. In addition, the data for each vertex may include color values and texture coordinates provided with the primitive in step 148.

In step 268 a data stream is accepted from the primary rasterizer, and in step 270 the next graphics order is retrieved. In step 272, if the graphics order corresponds to a drawing primitive, then in step 276 the next area component of the primitive is retrieved. Otherwise, in step 274, other appropriate processing is performed, and the next graphics order is retrieved in step 270.

Following step 276, in step 278 the value of NUM1 in the pixel mask is tested. If NUM1 is 0, then no pixels of the current area component passed the z-comparison test and processing continues to step 292. Otherwise, if NUM1 is not 0, then at least one pixel of the area component is visible, and processing continues to step 280. In steps 280 and 282, the new vertex (vi) is subjected to transformation calculations substantially equivalent to those implemented in the conventional geometry processor. The transformation calculations are performed only on the original vertices, not those produced by clipping.

In step 284, if the vertices which define the current area component are not trivially accepted, then the vertex coordinates are subjected to a view transformation and projection in step 286. Then, in step 288, the resulting transformed and projected vertices are subjected to window/viewport clipping logic.

If window/viewport clipping is performed on any area component, the clipping logic must provide vertex coordinates and normal vectors in world coordinates for any new vertices created by the clipping operations. The vertex coordinates and normal vectors for these new vertices may be determined by linear interpolation of the x, y, and z components of these vectors based on the values of the corresponding components at the vertices of the area component. The resulting interpolated normal vectors will generally not form unit vectors. These vectors may be converted into unit vectors by multiplying by an appropriate scale factor, but this is not necessary at this point because a similar scale factor will be applied by the secondary rasterizer for Phong shading prior to performing the lighting calculations. Also, the vertex coordinates in world coordinates are not required unless the lighting equations are to be performed with a perspective projection (a condition known as a "local viewer") and/or one or more light sources are treated as being located at a finite distance from the drawing primitives being rendered. Further, the color clamping stage of the secondary geometry processor for Gouraud shading is not present in this processor because the lighting calculations are not performed here.

The data required to represent the current area component are sent to the secondary rasterizer in step 290. If the current area component has been trivially accepted, this data consists of the transformed coordinates and normal vectors determined in steps 280 and 282, as well as other data received from the primary rasterizer in step 270. If this area component was not trivially accepted, the data sent to the secondary rasterizer may include equivalent data for accepted vertices as well as data for any additional vertices created by the clipping logic in step 288.

In step 292, if there are more area components in the current primitive, then the next area component is retrieved in step 276. Otherwise, the next graphics order is retrieved in step 270.

2. Secondary Rasterizer

Figure 12:
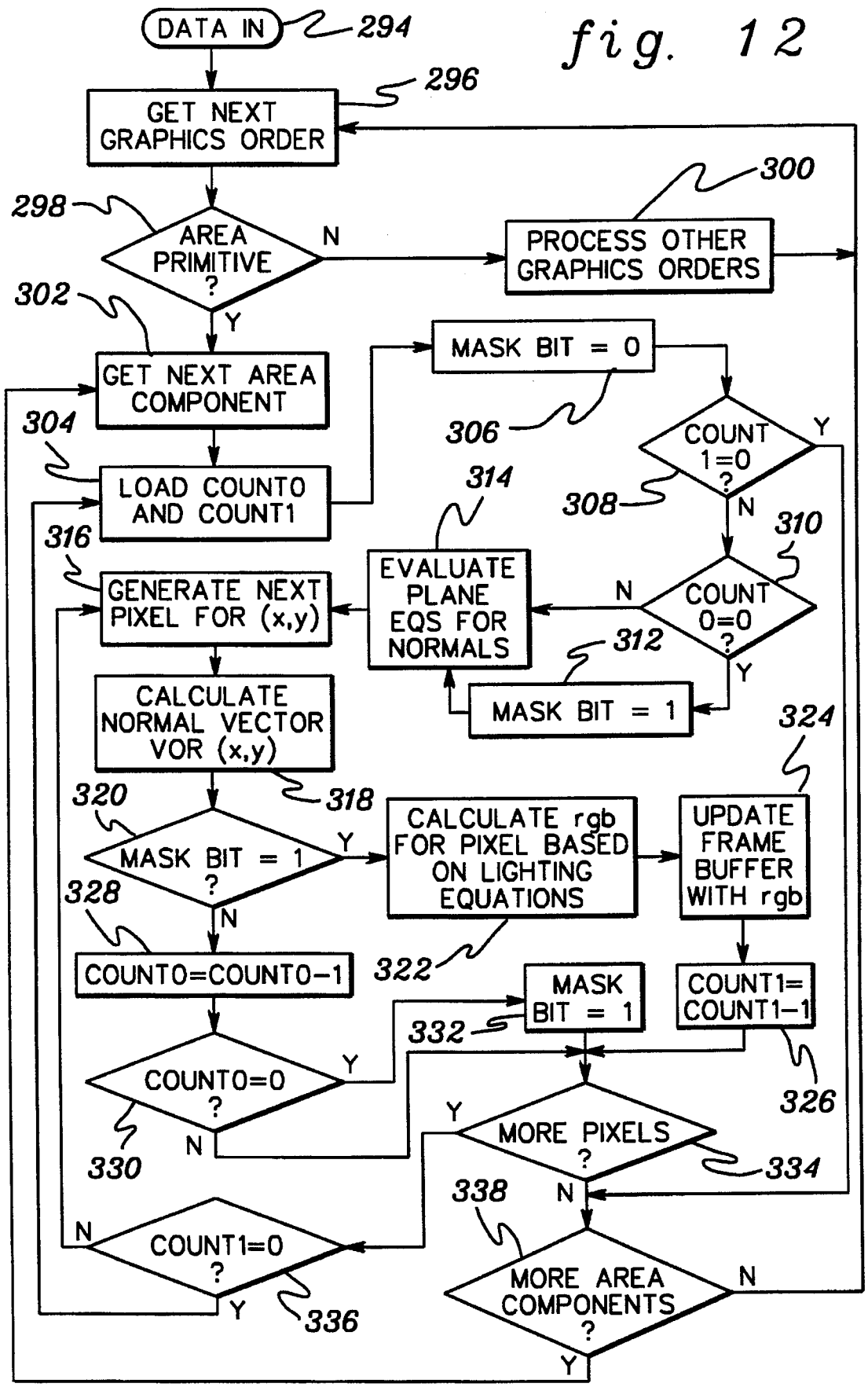
FIG. 12 is a logic flow diagram for a secondary rasterizer according to the present invention that supports Phong shading.

FIG. 12 illustrates the operation of a secondary rasterizer according to the present invention. The operation of the secondary rasterizer for Phong shading is substantially similar to that of the secondary rasterizer for Gouraud shading, except that the plane equations are evaluated in terms of the x, y, and z components of the vertex coordinates and reflectance normals instead of the color components (r, g, and b).

In step 294, data is accepted from the secondary geometry processor, and in step 296 the next graphics order is processed. In step 298, if the graphics order corresponds to an area primitive, then the next area component is retrieved in step 302. Otherwise, other appropriate processing is performed in step 300.

In step 304 two counters COUNT0 and COUNT1 are loaded from the pixel mask, and in step 306 a flag MASK is set to 0. In step 308 if COUNT1 is zero, then processing continues to step 338. If COUNT1 is not zero, then in steps 310 and 312, if COUNT0 is 0, then MASK is set to 1. In step 314 the plane equations are evaluated for the reflectance normal vectors.

In step 316, x and y values are generated for the current pixel, and in step 318 the plane equations are used to interpolate the x, y, and z components of the vertex coordinates and reflectance normals for the current pixel. The pixel coordinates in world coordinates are not required unless the lighting equations are to be performed with a perspective projection (a condition known as a "local viewer") and/or one or more light sources are treated as being located at a finite distance from the drawing primitives being rendered.

In step 320, if MASK equals 1, then in step 322 the interpolated normal vectors are scaled to produce unit vectors, and the resulting unit vectors, along with the interpolated vertex coordinates (when they are needed), are then used to perform lighting calculations for the current pixel, resulting in a set of color values (r, g, b) therefor. In step 324 the color values are used to update the frame buffer substantially as in the secondary rasterizer for Gouraud shading. In step 326, COUNT1 is decremented, and processing continues to step 334.

On the other hand, in step 320, if MASK equals 0, then in step 328, COUNT0 is decremented. In steps 330 and 332, if COUNT0 is 0, then MASK is set to 1. Processing continues to step 334.

In step 334, if there are more pixels for the current area component, then in step 336 the value of COUNT1 is tested. If COUNT1 is 0, then the next values of COUNT0 and COUNT1 are loaded from the pixel mask. If COUNT1 is not zero, then the next pixel for the current area component is generated in step 316.

In step 338, if there are more area components, then in step 302 the next component is retrieved. In step 338, if there are no more area components, then the next graphics order is retrieved in step 296. Although not shown in FIG. 12, color mapping and clamping are performed following lighting calculations, as wil be recognized by one skilled in the art.

ADDITIONAL GRAPHICS SUBSYSTEM FEATURES

Although the present invention has been described in detail above, it is not intended to be limited to the specific form set forth herein, but, on the contrary, it is intended to cover such alternatives and equivalents as can reasonably be included within the spirit and scope of the invention as defined by the appended claims.

For example, in other embodiments according to the present invention, the same hardware could be used for both the primary and secondary stages. The need to perform secondary functions would take priority over primary functions, but this would occur infrequently for scenes having high depth complexity (two-pass method).

We claim:

1. A computer graphics system for processing data for a sequence of graphical primitives and having a frame buffer coupled to a display device, comprising:

means for generating a plurality of pixels for each primitive in said sequence of graphical primitives;

means for determining whether respective current primitives in said sequence of graphical primitives are hidden or visible relative other primitives in said sequence of graphical primitives, a hidden determination indicating that no pixel of said current primitive will be displayed on said display device; and means for performing graphical calculations for only primitives of said current primitives determined as visible, said means for performing graphical calculations performing graphical calculations for each of said current primitives when, and as, determined to be visible.

2. The system of claim 1 further comprising means for updating said frame buffer per each current primitive of said current primitives when said each current primitive is determined as visible.

3. The system of claim 1 further comprising:

means for determining each respective pixel of said pixels as hidden or visible, said hidden determination indicating that said each respective pixel will not be displayed on said display device; and means for updating said frame buffer per pixels of said respective pixels determined as visible.

4. The system of claim 1 wherein said primitives comprise triangles.

5. The system of claim 1 wherein said means for generating a plurality of pixels comprises a rasterizer for processing Z coordinates of said primitives to provide an associated Z coordinate for each pixel of the plurality of pixels of said primitives.

6. The system of claim 1 wherein said means for determining comprises:

a z-buffer for storing depth information for each pixel of the associated frame buffer; and means for comparing Z-values of the pixels of said respective current primitives to the depth information of associated pixels in said Z buffer.

7. The system of claim 1 wherein said graphical calculations comprise lighting calculations.

8. The system of claim 7 wherein said lighting calculations comprise calculations using reflectance normals.

9. The system of claim 7 wherein said lighting calculations comprise Gouraud shading.

10. The system of claim 7 wherein said lighting calculations comprise Phong shading.

11. The system of claim 1 wherein said means for performing graphical calculations comprises means for rasterizing non-coordinate values for each of said primitives classified as visible.

12. The system of claim 11 wherein said non-coordinate values comprise red, green, blue, or intensity.

13. In a computer graphics system having a frame buffer coupled to a display device, a method for processing data for a sequence of graphical primitives, comprising the steps of:

generating a plurality of pixels for each primitive in said sequence of graphical primitives;

determining whether respective current primitives in said sequence of graphical primitives are hidden or visible relative other primitives in said sequence, a hidden determination indicating that no pixel of said current primitive will be displayed on said display device; and performing graphical calculations for only primitives of said current primitives determined as visible, said graphical calculations being performed for each of said current primitives when, and as, determined to be visible.

14. The method of claim 13 further comprising the step of updating said frame buffer per each current primitive of said current primitives when said each current primitive is determined as visible.

15. The method of claim 13 further comprising the steps of:

determining each respective pixel of said pixels as hidden or visible, said hidden determination indicating that said each respective pixel will not be displayed on said display device; and updating said frame buffer per pixels of said respective pixels determined as visible.

16. The method of claim 13 wherein said primitives comprise triangles.

17. The method of claim 13 wherein said step of generating a plurality of pixels comprises using a rasterizer for processing Z coordinates of said primitives to provide an associated Z-coordinate for each pixel of the plurality of pixels of said primitives.

18. The method of claim 13 wherein said step of determining comprises:

using a z-buffer for storing depth information for each pixel of the associated frame buffer; and comparing Z-values of the pixels of the respective current primitives to the depth information of associated pixels in said Z-buffer.

19. The method of claim 13 wherein said step of performing graphical calculations comprises performing lighting calculations.

20. The method of claim 19 wherein said lighting calculations comprise calculations using reflectance normals.

21. The method of claim 19 wherein said lighting calculations comprise Gouraud shading.

22. The method of claim 19 wherein said lighting calculations comprise Phong shading.

23. The method of claim 13 wherein said step of performing graphical calculations comprises the step of rasterizing non-coordinate values for each of said primitives classified as visible.

24. The method of claim 23 wherein said noncoordinate values comprise red, green, blue, or intensity.

25. The method according to claim 13 wherein said step of determining includes:

determining visible portions of said respective current primitives determined as visible relative other primitives in said sequence of graphical primitives; and providing a pixel mask for each of said current primitives determined as visible, in accordance with the associated visible portions thereof;

said method further comprising updating said frame buffer per select pixels of said respective current primitives determined as visible in accordance with associated pixel masks.

26. The method according to claim 25 wherein said step of determining visible portions of said respective current primitives includes scanning each of said respective current primitives across predetermined scan paths; and said step of providing a pixel mask for each of said current primitives determined as visible includes:

generating a string of data for said each current primitive determined as visible in accordance with the visible portions thereof within its associated scan path; and encoding, per a given compression method, said serial string of data in accordance with its associated sequence and run length of 1's and 0's.

27. The method of claim 26 wherein said step of updating the frame buffer includes determining said select pixels of said respective current primitives by decoding its associated pixel mask per an inverse of said given compression method.

* * * * *